US012048920B2

(12) United States Patent
VanPatten et al.

(10) Patent No.: US 12,048,920 B2
(45) Date of Patent: Jul. 30, 2024

(54) SYSTEM AND PROCESS FOR REPLACING A CORE OF DIESEL EMISSION CONTROL DEVICE

(71) Applicant: Diesel Emission Technologies LLC, Coppell, TX (US)

(72) Inventors: Mike VanPatten, Flower Mound, TX (US); Pete Lambe, Heath, TX (US)

(73) Assignee: Diesel Emission Technologies LLC, Coppell, TX (US)

( * ) Notice: Subject to any disclaimer, the term of this patent is extended or adjusted under 35 U.S.C. 154(b) by 23 days.

(21) Appl. No.: 17/812,052

(22) Filed: Jul. 12, 2022

(65) Prior Publication Data
US 2023/0019521 A1 Jan. 19, 2023

Related U.S. Application Data

(60) Provisional application No. 63/220,887, filed on Jul. 12, 2021.

(51) Int. Cl.
*B01J 37/00* (2006.01)
*F01N 3/035* (2006.01)
*F01N 3/28* (2006.01)

(52) U.S. Cl.
CPC .......... *B01J 37/0009* (2013.01); *F01N 3/035* (2013.01); *F01N 3/2853* (2013.01); *F01N 2450/30* (2013.01)

(58) Field of Classification Search
CPC ............. F01N 2350/02; F01N 2450/00; F01N 2450/30; F01N 3/035; F01N 3/2853; F01N 3/0211; F01N 3/2839; B01J 37/0009
See application file for complete search history.

(56) References Cited

U.S. PATENT DOCUMENTS

| 5,557,847 | A | 9/1996 | Koshiba et al. |
| 8,225,476 | B2 | 7/2012 | Mayfield |
| 8,661,671 | B2 | 3/2014 | Hill, Jr. |
| 10,995,695 | B1 * | 5/2021 | Hilgendorf ............ B65G 59/08 |
| 2003/0000088 | A1 * | 1/2003 | Mayfield ................. F01N 13/14 29/890 |
| 2004/0031149 | A1 | 2/2004 | Irie et al. |
| 2017/0310389 | A1 | 10/2017 | McMonagle |
| 2019/0242377 | A1 * | 8/2019 | Huang ........................ F16J 7/00 |
| 2021/0290455 | A1 * | 9/2021 | Kamphus ........... A61F 13/15658 |

FOREIGN PATENT DOCUMENTS

CN 102840012 8/2014

* cited by examiner

*Primary Examiner* — Moshe Wilensky
(74) *Attorney, Agent, or Firm* — Spencer Fane, LLP

(57) ABSTRACT

A system for removing an existing core from a diesel emission control device (DECD) housing and a system for installing a replacement core into the DECD housing. The system for removing the existing core comprising a core press station, a control station, and a decore shaft. The system for installing the replacement core comprising a core press station, a control station, and a recore shaft. A stuffing funnel and spacer may be used to install the replacement core. In certain embodiments, processes for removing the existing core and installing the replacement core may comprise the steps of pressing the existing core out of the DECD housing, collecting the existing core into a collection container, sealing the collection container, wrapping the replacement core with matting, lubricating the matting, and pressing together the replacement core and the existing DECD housing.

5 Claims, 24 Drawing Sheets

SYSTEM AND PROCESS FOR REPLACING A CORE OF DIESEL EMISSION CONTROL DEVICE

CROSS-REFERENCE TO RELATED APPLICATIONS

This application claims priority from U.S. Provisional Patent Application Ser. No. 63/220,887, filed Jul. 12, 2021, entitled "System and Process for Replacing a Core of Diesel Emission Control Device," which is herein incorporated by reference in its entirety.

TECHNICAL FIELD

The invention relates in general to the recycling of diesel emission control devices (DECDs), and in particular to a system and process for removing and inserting cores of diesel emission control devices, such as diesel particulate filters (DPFs), diesel oxidation catalysts (DOCs), and/or selective reduction catalysts (SCRs).

SUMMARY

In an embodiment, a system is disclosed comprising of a press for removing and inserting cores of various shapes and sizes and an adjustable wrapping station for preparing a replacement core plus various tools and equipment for implementing a process of removing and inserting cores using the disclosed system.

In another embodiment, a system for removing an existing core from a DECD housing may comprise: a core press station having a piston and a working platform; a control station for controlling movement the piston; and a decore shaft connected to the piston, whereby movement of the piston is configured to push the existing core out of the DECD housing. The control station may include a two-handed sensor system for activation control of the core press station.

In another embodiment, the system for removing an existing core from a DECD housing may further comprise: a push plate positioned upon the working platform, the push plate having a first internal aperture configured to pass the existing core therethrough; a pushout donut demountably connected to the push plate, the pushout donut having a second internal aperture configured to pass the existing core therethrough; and a collection container connected between the push plate and the pushout donut, the collection container configured to receive the existing core.

In another embodiment, the decore shaft includes a decore shaft portion having a first female aperture configured to connect to the piston, and a decore engagement plate disposed opposite the first female aperture.

In yet another embodiment, the first internal aperture comprises a first diameter, the first diameter is greater than an inside diameter of the DECD housing. In another embodiment, the second internal aperture comprises a second diameter, the second diameter is approximately equal to an inside diameter of the DECD housing.

In another embodiment, a system for installing a replacement core into a DECD housing comprising: a core press station having a piston and working platform; a control station for controlling movement of the piston; a recore shaft connected to the piston; a stuffing funnel configured to couple to the DECD housing proximate an upper end of the DECD housing; and a spacer connected to the working platform, the spacer configured to fit within the DECD housing proximate a lower end of the DECD housing, whereby movement of the piston is configured to press the replacement core through the stuffing funnel and into the DECD housing until the replacement core abuts the spacer. The control station may include a two-handed sensor system for activation control of the core press station.

In another embodiment, the system for installing a replacement core into the DECD housing includes an adjustable wrapping station having a set of rollers for supporting the replacement core. In an embodiment, a matting may be connected to the replacement core.

In yet another embodiment, the recore shaft includes a recore shaft portion having a second female aperture configured to connect to the piston, and a recore engagement plate disposed opposite the second female aperture.

In another embodiment, a process for removing an existing core from a DECD housing may comprise the steps of: (1) providing a core press station having a working platform; (2) connecting a collection container between the working platform and the DECD housing; (3) aligning the DECD housing over the collection container; (4) pressing the existing core out of the DECD housing; and (5) collecting the existing core into the collection container.

In another embodiment, the process for removing an existing core from a DECD housing may include the step of sealing the collection container and sending the collection container offsite.

In another embodiment, a process for inserting a replacement core into a DECD housing, comprising the steps of: (1) providing a core press station having a working platform; (2) placing the DECD housing onto the working platform; (3) coupling a stuffing funnel to the DECD housing; (4) wrapping the replacement core with a matting; (5) wrapping the matting with a wrapping material; (6) lubricating the stuffing funnel, an interior surface of the DECD housing, and the wrapping material; and (7) pressing the replacement core through the stuffing funnel and into the DECD housing.

In another embodiment, the process for inserting a replacement core into a DECD housing may include the additional steps of: determining an overhang distance between an unobstructed side of the DECD housing and a face of an existing core; selecting a spacer based the overhang distance; placing the spacer onto the working platform; aligning the DECD housing over the spacer; and stopping the pressing step when the replacement core abuts the spacer.

In another embodiment, the process for inserting a replacement core into a DECD housing may include the additional steps of: determining a housing flow direction of the DECD housing; aligning the DECD housing with the working platform based on the housing flow direction so that the housing flow direction is directed towards the working platform; determining a core flow direction of the replacement core; and aligning the core flow direction with the housing flow direction.

In yet another embodiment, the process for inserting a replacement core into a DECD housing may include the step of selecting the stuffing funnel based on an inside diameter of the DECD housing and an outside diameter of the replacement core.

In yet another embodiment, the wrapping material may comprise a wrapping tape.

There is also an embodiment of a process for removing and inserting cores into DECDs. In certain embodiments, the process comprises pressing the existing core out of a DECD housing and into a collection container, sealing the collection container, wrapping a replacement core with matting, and inserting the replacement core into the existing DECD housing.

The systems and processes for removing and inserting a replacement core provides for an efficient and economical means to refurbish a diesel emission control device.

These and other features, and advantages, will be more clearly understood from the following detailed description taken in conjunction with the accompanying drawings. It is important to note the drawings are not intended to represent the only aspect of the invention.

BRIEF DESCRIPTION OF THE DRAWINGS

The drawings constitute a part of this specification and include exemplary embodiments of the disclosed subject matter and illustrate various objects and features thereof.

DETAILED DESCRIPTION

Figure 1:
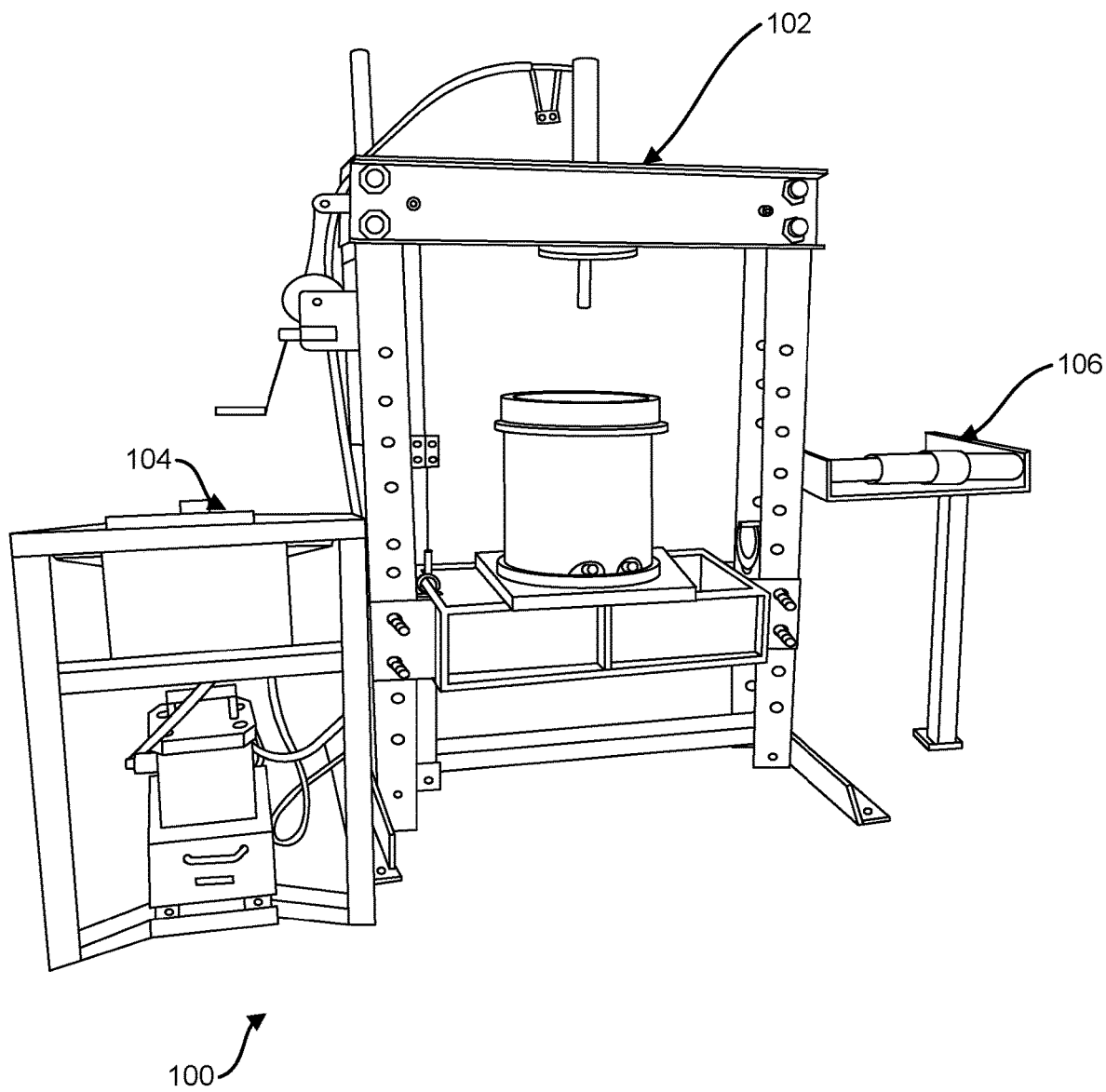
FIG. 1 is a front perspective view of a system for removing and inserting a core into a diesel emission control device.

For the purposes of promoting an understanding of the principles of the present inventions, reference will now be made to the embodiments, or examples, illustrated in the drawings and specific language will be used to describe the same. It will nevertheless be understood that no limitation of the scope of the invention is thereby intended. Any alterations and further modifications in the described embodiments, and any further applications of the principles of the inventions as described herein are contemplated as would normally occur to one skilled in the art to which the invention relates.

Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

The detailed description includes the disclosure of numerical ranges. Numerical ranges should be construed to provide literal support for claim limitations reciting only the upper vale of a numerical range, and provide literal support for claim limitations reciting only the lower value of a numerical range.

When directions, such as upper, lower, top, bottom, clockwise, counter-clockwise, are discussed in this disclosure, such directions are meant to only supply reference directions for the illustrated figures and for orientation of components in respect to each other or to illustrate the figures. The directions should not be read to imply actual directions used in any resulting invention or actual use. Under no circumstances, should such directions be read to limit or impart any meaning into the claims.

The disclosed subject matter will now be described with reference to the drawing figures, in which like reference numerals refer to like parts throughout. For purposes of clarity in illustrating the characteristics of the present disclosed subject matter, proportional relationships of the elements have not been maintained in the drawing figures. In some cases, the sizes of certain small components have been exaggerated for illustration.

Turning now to FIG. 1, there is presented one embodiment of a system 100 for removing an existing core and inserting a replacement core into a diesel emission control device (DECD). Both the existing core and the replacement core are typically cylindrical in shape and comprise a cross section having a circular shape. The system 100 may be configured to remove and replace cores having cross sections of various shapes, such as a square, rectangle, triangle, parallelogram, rhombus, trapezium, octagon, hexagon, pentagon, ellipse, oval, and other shapes known in the art. In the illustrated embodiment, the system 100 comprises a core press station 102 and a control station 104. In another embodiments, the system further comprises an adjustable wrapping station 106. In some embodiments, however, the control station 104 may be integrated into the core press station 102.

In certain embodiments, the adjustable wrapping station 106 may be a standalone unit as illustrated in FIG. 1 or integrated into the structure of the core press station 102. In yet other embodiments, the adjustable wrapping station 106 may be eliminated. In certain embodiments, the adjustable wrapping station 106 provides a primary roller to dispense a wrapping material in addition to a plurality of horizontally aligned secondary rollers to allow for a convenient turning of a replacement core and wrapping of a wrapping material, such as wrapping tape, around a replacement core and matting material as will be described in more detail below.

Figure 2A:
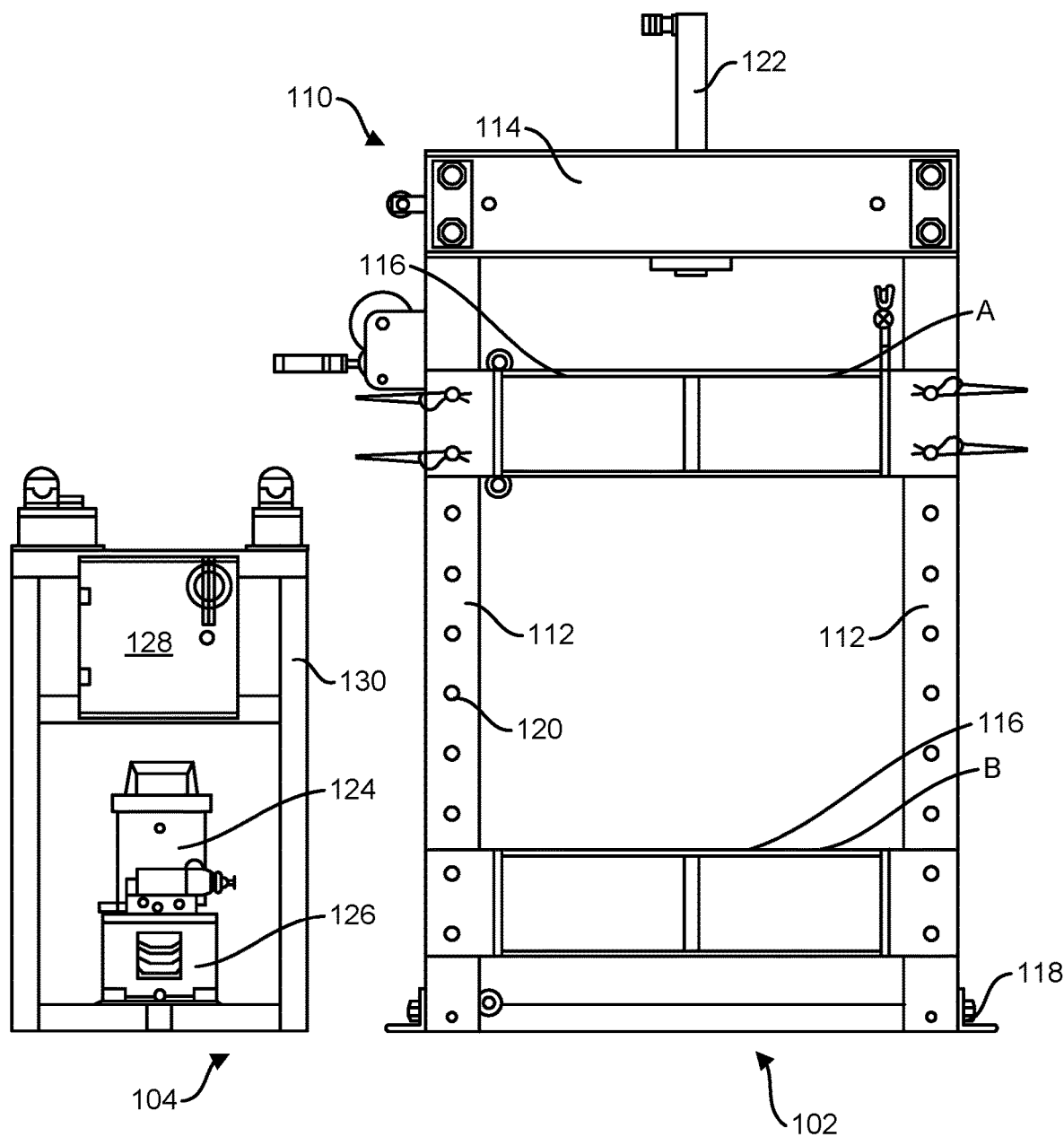
FIG. 2A is a front view of an embodiment of a core press station and a control station.
Figure 2B:
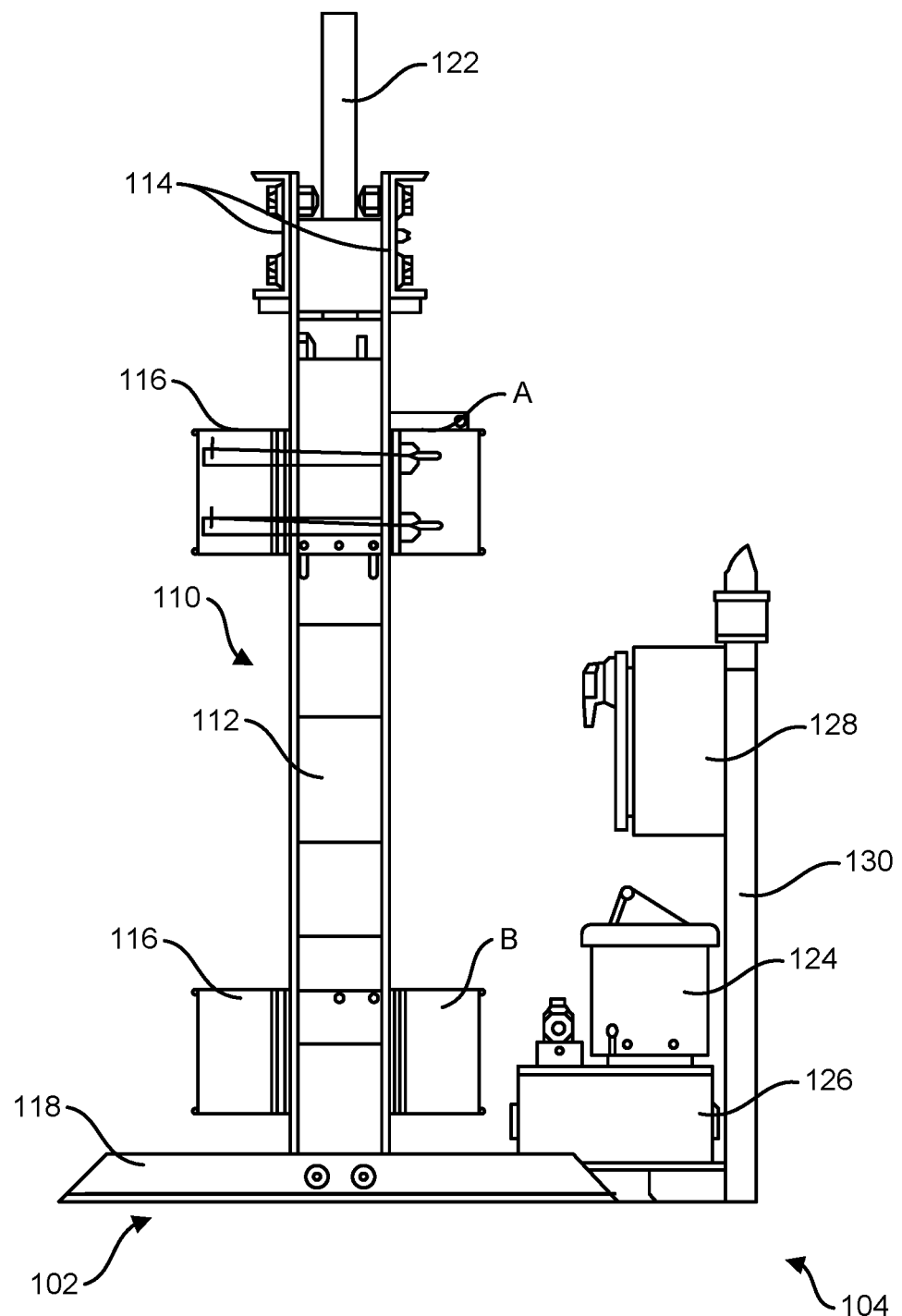
FIG. 2B is a side view of an embodiment of a core press station and a control station.
Figure 2C:
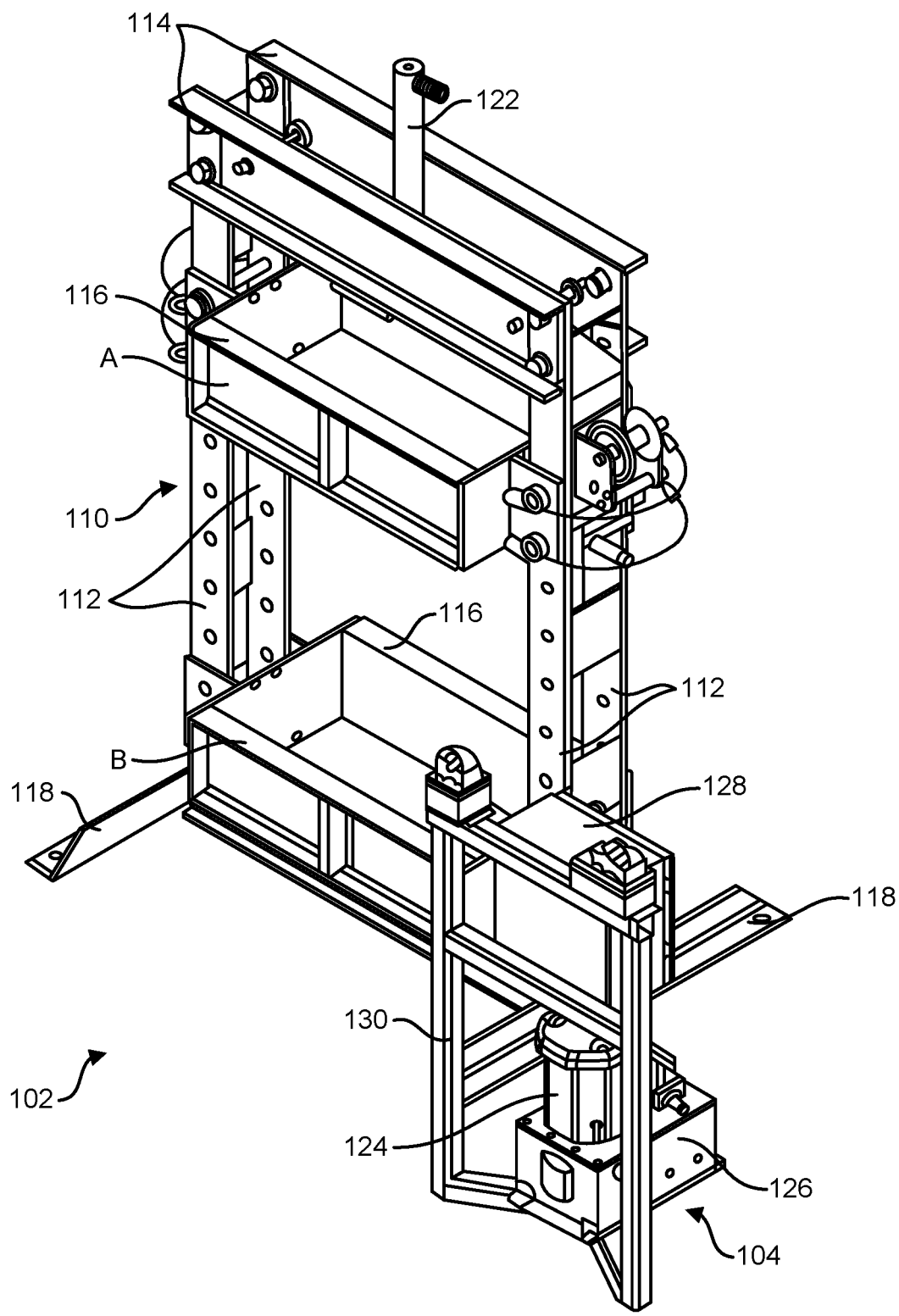
FIG. 2C is an isometric view of an embodiment of a core press station and a control station

FIG. 2A is a front view of the core press station 102 and the control station 104. FIG. 2B is a side view of the core press station 102 and the control station 104 and FIG. 2C is an isometric view of the core press station 102 and the control station 104.

In certain embodiments, the core press station 102 includes a press such as a hydraulic press, which may include a press frame 110. In certain embodiments, the press frame 110 includes vertical columns 112, one or more top cross beams 114, one or more lower cross beams which form part of a working platform 116, and foundation brackets 118 which are coupled to the lower ends of the vertical columns 112. In certain embodiments, the working platform 116 is adjustable via bolt holes 120 and support bolts or pins (not shown). FIG. 2A-2C illustrate the working platform 116 in an extreme upper position A and also in an extreme lower position B.

In certain embodiments, a master cylinder 122 is coupled to the one or more top cross beams 114. The master cylinder 122 provides the force necessary to press the existing and replacement cores out of and into the housing as described below.

In certain embodiments, the control station 104 comprises a master pump motor 124 which, in the illustrated embodiment, runs a hydraulic pump to create oil flow and pressure used during operation. In certain embodiments, a hydraulic oil tank 126 is positioned below the master pump motor 124. In the illustrated embodiment, a control box 128 is supported by a control station frame 130. In certain embodiments, the control box 128 contains electrical circuits for supplying power to the master pump motor 124 and a PLC programmable controller (not shown) for controlling the operation of the master pump motor 124 and the master cylinder 122. The various circuitry and controllers in the control box 128, the master pump motor 124, and the master cylinder 122 are integrated together with the hydraulic lines, electrical wiring, and devices known in the art.

Figure 3A:
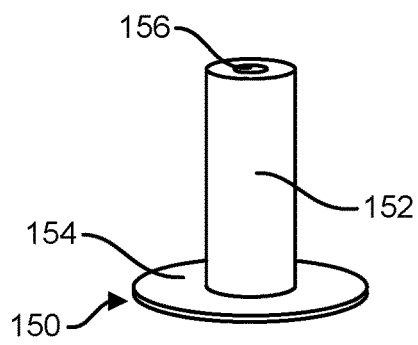
FIG. 3A is an isometric view of an embodiment of a decore shaft.
Figure 3B:
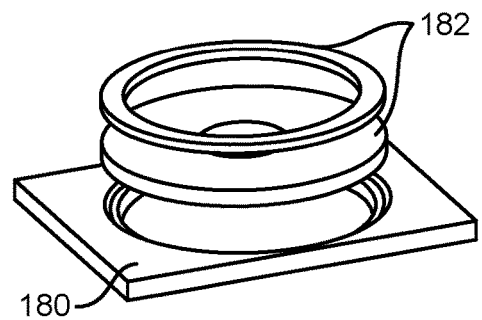
FIG. 3B is an isometric view of an embodiment of a push plate and pushout donuts.

FIG. 3A-3B illustrate various components for use with the core press station 102 during a core removal process. FIG. 3A is an isometric drawing illustrating a decore shaft 150 which is designed to remove cores from the DECD housings as explained below. In certain embodiments, the decore shaft 150 contains a decore shaft portion 152 where one end is coupled to a decore engagement plate 154. In an embodiment, the decore engagement plate 154 comprises a circular disk. In certain embodiments, a first female aperture 156 having internal threads is defined within the longitudinal center of the decore shaft portion 152. The first female aperture 156 is sized to removably engage exterior threads defined on a piston (not shown) of the master cylinder 122. The decore engagement plate 154 disposed opposite the first female aperture 156.

FIG. 3B is an isometric drawing illustrating a push plate 180 and a plurality of pushout donuts 182 in various sizes for coupling to a collection container, such as a plastic collection bag (not shown).

Figure 4A:
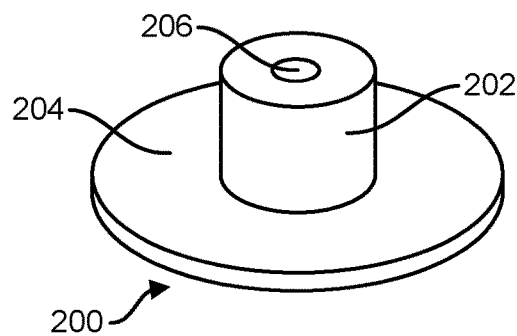
FIG. 4A is an isometric view of an embodiment of a recore shaft.

FIGS. 4A-4D illustrate various components for use with the core press station 102 during a core insertion process. FIG. 4A is an isometric drawing illustrating a recore shaft 200 which is designed to insert cores into the DECD housings as explained below. In certain embodiments, the recore shaft 200 comprises a recore shaft portion 202 where one end is coupled to a recore engagement plate 204. In an embodiment, the recore engagement plate 204 comprises a disk. In certain embodiments, a second female aperture 206 having internal threads is defined within the longitudinal center of the recore shaft portion 202. The second female aperture 206 is sized to removably engage exterior threads defined on a piston (not shown) of the master cylinder 122. The recore engagement plate 204 disposed opposite the second female aperture 206.

Figure 4B:
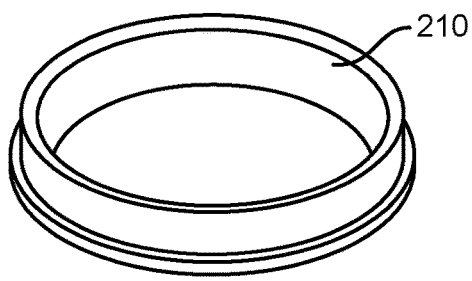
FIG. 4B is an isometric view of an embodiment of a stuffing funnel.

FIG. 4B is an isometric drawing of a stuffing funnel 210 sized to fit over one end of a DECD housing to aid the insertion process as explained below.

Figure 4C:
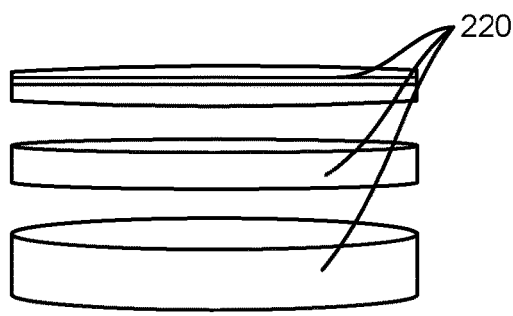
FIG. 4C is an isometric view of an embodiment of a plurality of spacers.
Figure 4D:
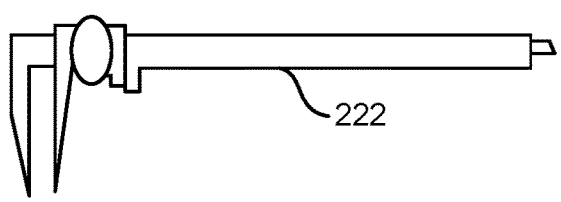
FIG. 4D is a side view of an embodiment of a caliper.

FIG. 4C is an isometric drawing of spacers 220 which are involved in the process of inserting a core into a DECD housing as explained below. FIG. 4D illustrates a caliper 222, such as an 18 inch caliber known in the art. In certain embodiments, the various components described in FIGS. 3A, 3B, 4A-4E may be made of steel or another material designed with sufficient strength and hardness to withstand the forces of a press.

Core Removal Process

Figure 5A:
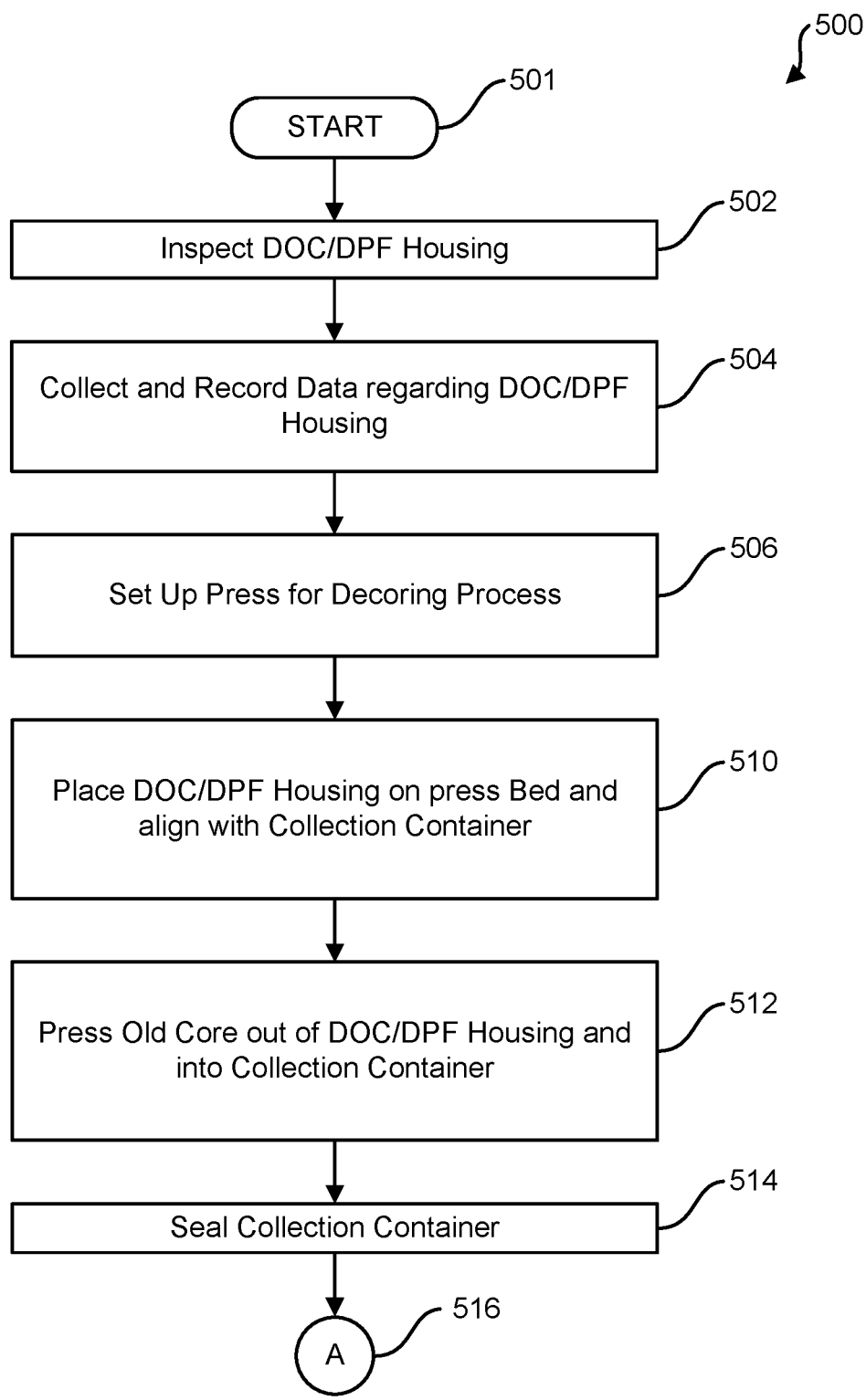
FIG. 5A is a flow chart illustrating an embodiment of a method for removing an existing core from a DECD unit.

Referring now to FIGS. 5A-6Q, the manner of using one embodiment of the system 100 will be illustrated via a core removal process 500 for removing an existing core from a DECD unit 600. The steps of the core removal process 500 are illustrated in FIG. 5A which is a process flow chart. Various details relating to the individual steps in the core removal process 500 are presented in FIGS. 6A-6O.

The core removal process 500 starts at step 501 and flows to step 502 where an operator may inspect the DECD housing 610 to check for cracks, failed welds, broken brackets, and retaining rings. During this inspection step, the operator can determine which side the core will be removed. In a preferred embodiment, the least unobstructed side is the preferred side where the core will be pushed out of the DECD housing 610.

Figure 6A:
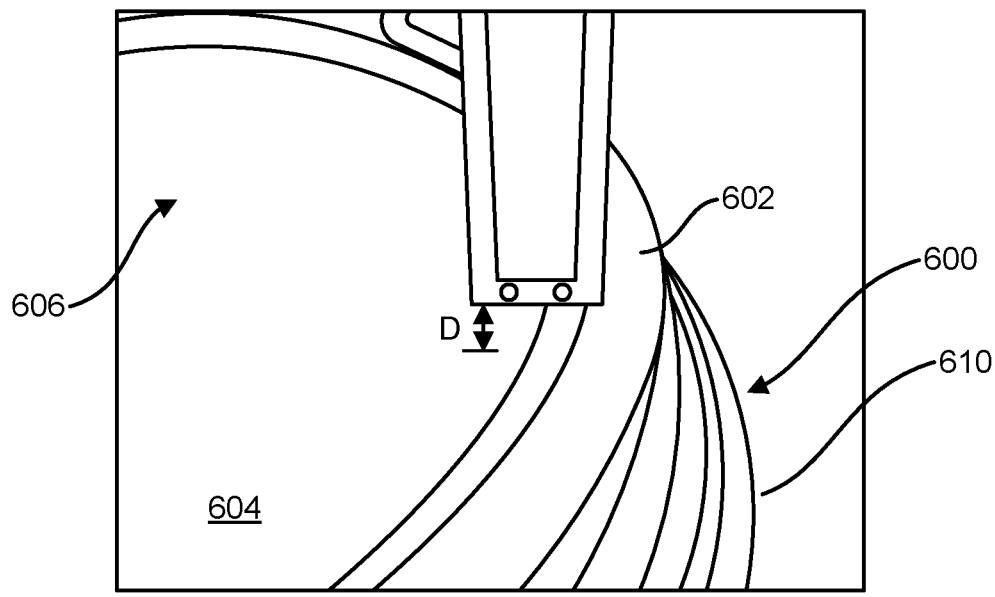
FIG. 6A is a perspective view of an embodiment of a DECD unit.
Figure 6B:
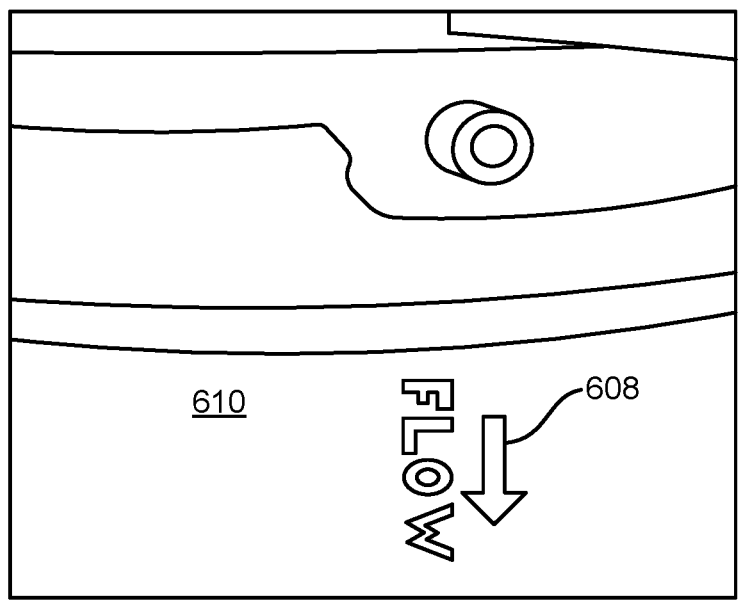
FIG. 6B is a perspective view of an embodiment of a DECD housing.
Figure 6C:
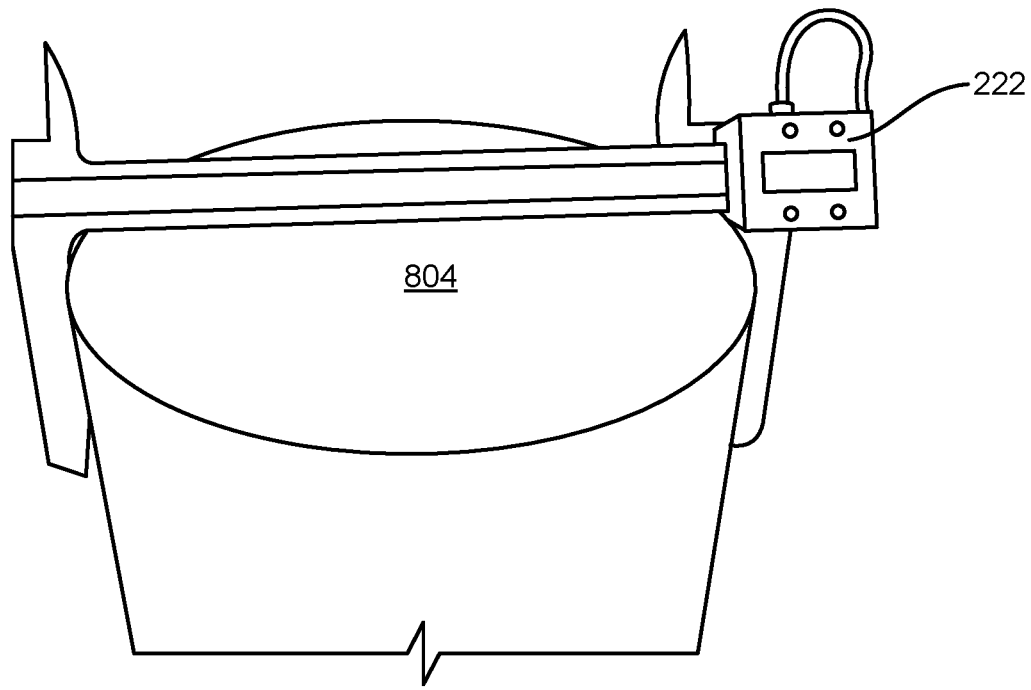
FIG. 6C is a perspective view of an embodiment of a replacement core.
Figure 6D:
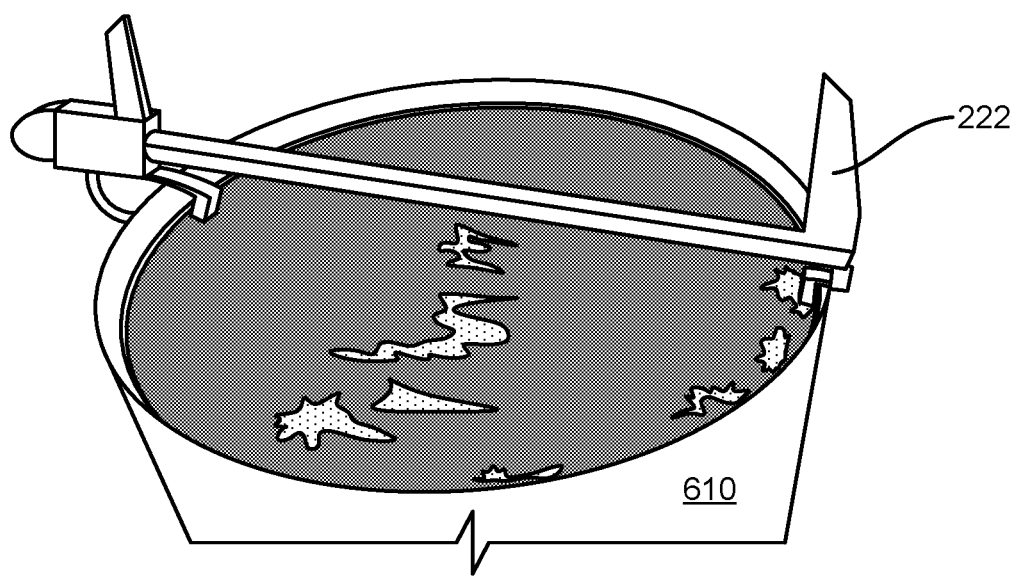
FIG. 6D is a perspective view of an embodiment of a DECD housing.

In step 504, data regarding the DECD unit 600 may be collected and recorded. For instance, an operator may measure and record an overhang distance D between an unobstructed side 602 of the DECD housing to a face 604 of the existing core 606 as illustrated in FIG. 6A. The overhang distance D will be the "depth to push to" in the following steps. The operator may also determine a housing flow direction of the DECD unit 600. The housing flow direction is usually marked by an arrow 608 on the exterior of the DECD housing 610 as illustrated in FIG. 6B. If the DECD housing 610 does not have any markings indicating the housing flow direction, the side of the existing core 606 with the most soot buildup will likely be the inlet side. Additionally, the operator may measure and record an outer dimension (O.D.) of a replacement core 804 using a caliper 222, or other suitable equipment, which is measured 1800 from outside of to outside of the core as illustrated in FIG. 6C. The operator may also measure and record the interior dimension (I.D.) of the DECD housing 610 using a caliper 222, or other suitable equipment, which is measured 180' apart from inside to inside of the DECD housing 610 as illustrated in FIG. 6D.

Figure 6E:
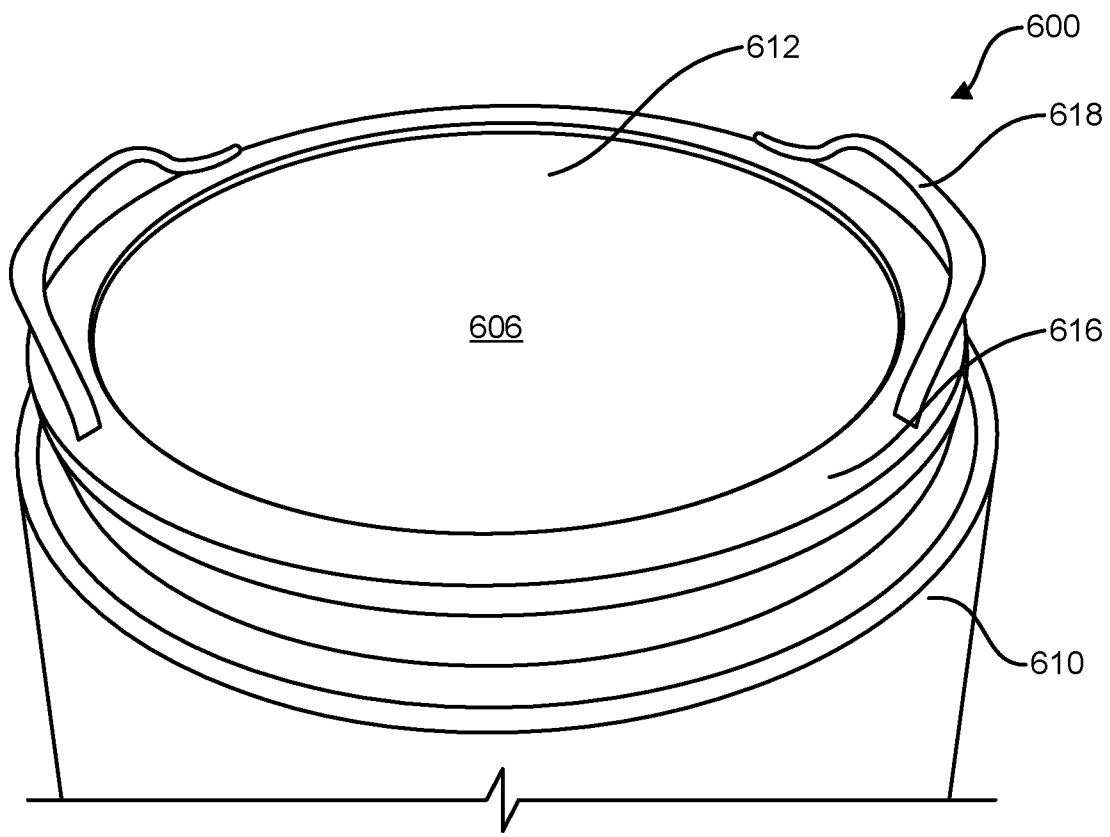
FIG. 6E is a perspective view of an embodiment of a first end of a DECD unit.
Figure 6F:
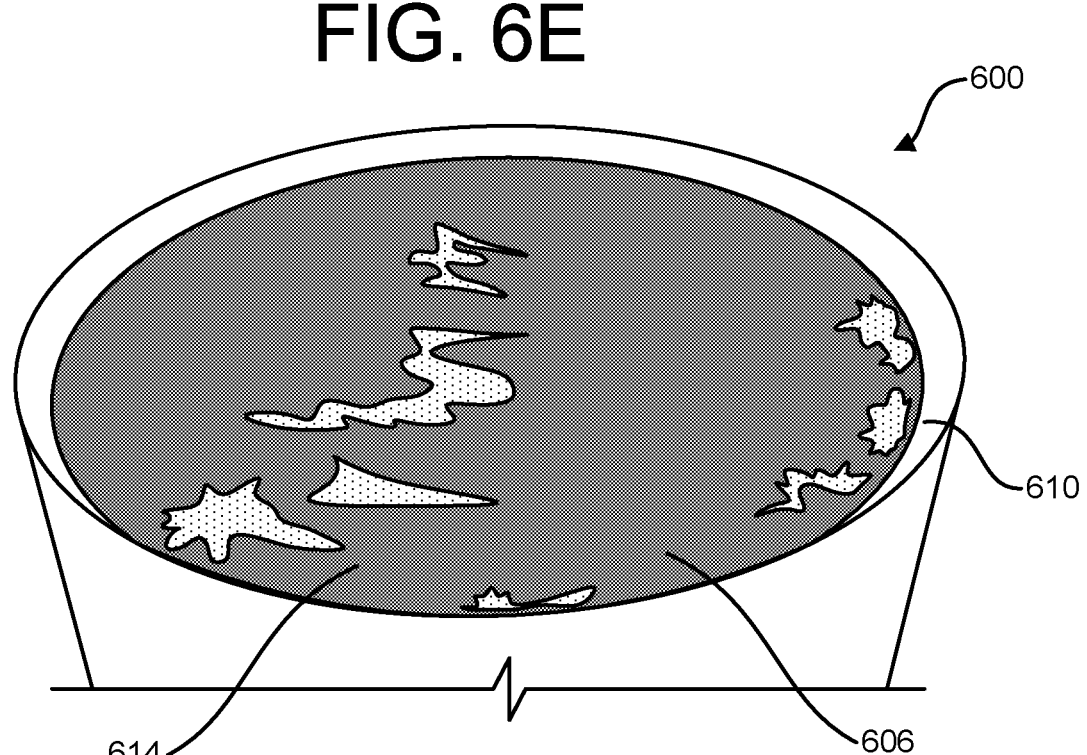
FIG. 6F is a perspective view of an embodiment of a second end of a DECD unit.

In certain situations, the DECD unit 600 may be used to determine the exit end for the existing core 606. FIG. 6E illustrates a first end 612 of a DECD unit 600 and FIG. 6F illustrates a second end 614 disposed opposite the first end 612. As illustrated, the first end 612 in FIG. 6E is obstructed by a flange 616 and handles 618. In contrast, the second end 614 illustrated in FIG. 6F appears to be clear of obstructions. In this specific example, the exit end for the existing core 606 and associated DECD housing 610 will be the second end 614.

Figure 6G:
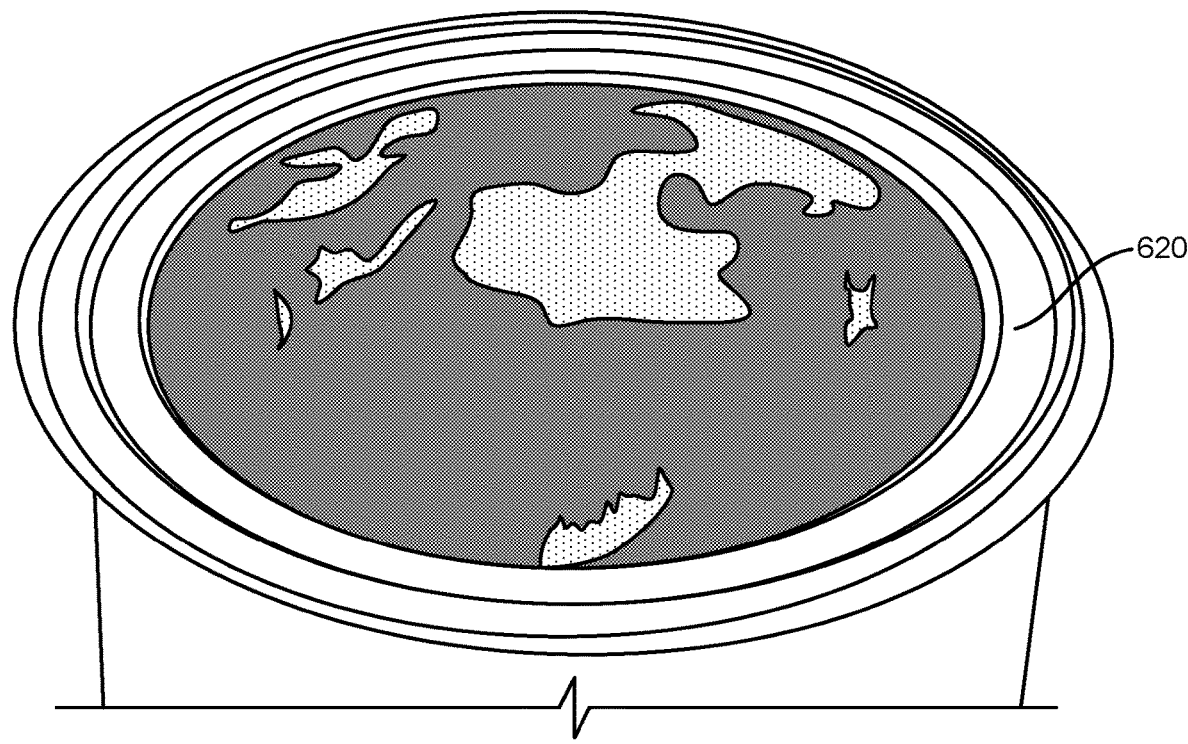
FIG. 6G is a perspective view of an embodiment of a DECD unit.

FIG. 6G illustrates an exemplary situation where there is an obstruction such as rings 620 on both ends of the DECD unit 600. In this situation, the operator may need to remove the obstruction from one end to create an exit end. The "push," therefore, will come from the opposing or obstructed end. The operator may need to check for, and remove, other obstructions from the DECD housing before the process continues such as, bungs, flow sleeves, cones, flanges, or retaining rings.

Figure 5B:
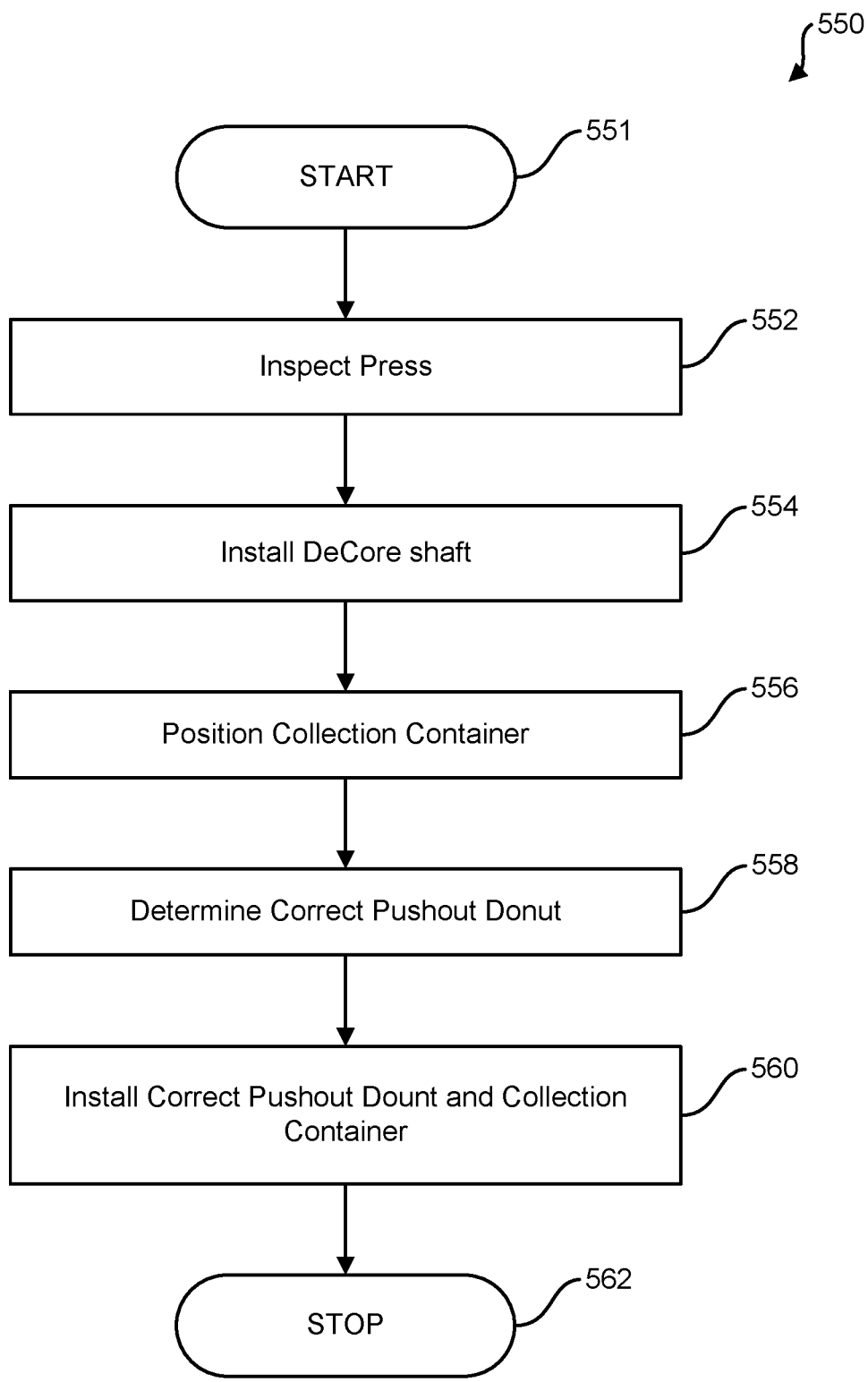
FIG. 5B is a flow chart illustrating an embodiment of a method for preparing a press operation.

In step 506, the core press station 102 may be set up for the decoring or core removal process. Turning now to FIG. 5B, there is illustrated a press preparation sub-process 550 for setting up the core press station 102 in order to remove a core from a DECD unit. This press preparation sub-process 550 begins at step 551 where the flow goes to step 552, which in some embodiments involves the inspection of the core press station to ensure that power is connected, there are no leaks in the hydraulic lines, the support pins are secured, and tooling, such as the push plate 180, is secured and bolted in place.

Figure 6H:
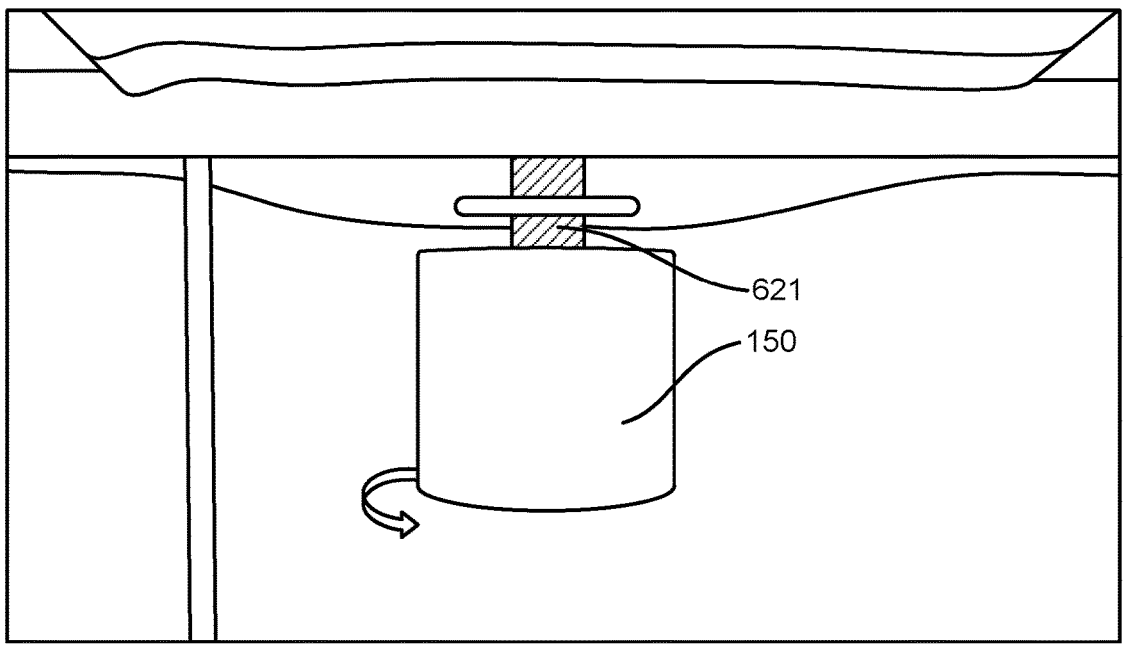
FIG. 6H is a side view of an embodiment of a decore shaft connected to a piston.

In step 554, the decore shaft 150 may be coupled to a lower end of a piston of the master cylinder 122. In certain embodiments, the first female aperture 156 of the decore shaft 150 is rotatably coupled to the threaded surface 621 of the piston as illustrated in FIG. 6H.

In step 556, a collection container 622 is positioned and secured to the core press station 102. In certain embodiments, a collection bag may be used as a collection container 622. In such embodiments, the collection bag is placed through a center aperture of the push plate.

Figure 6I:
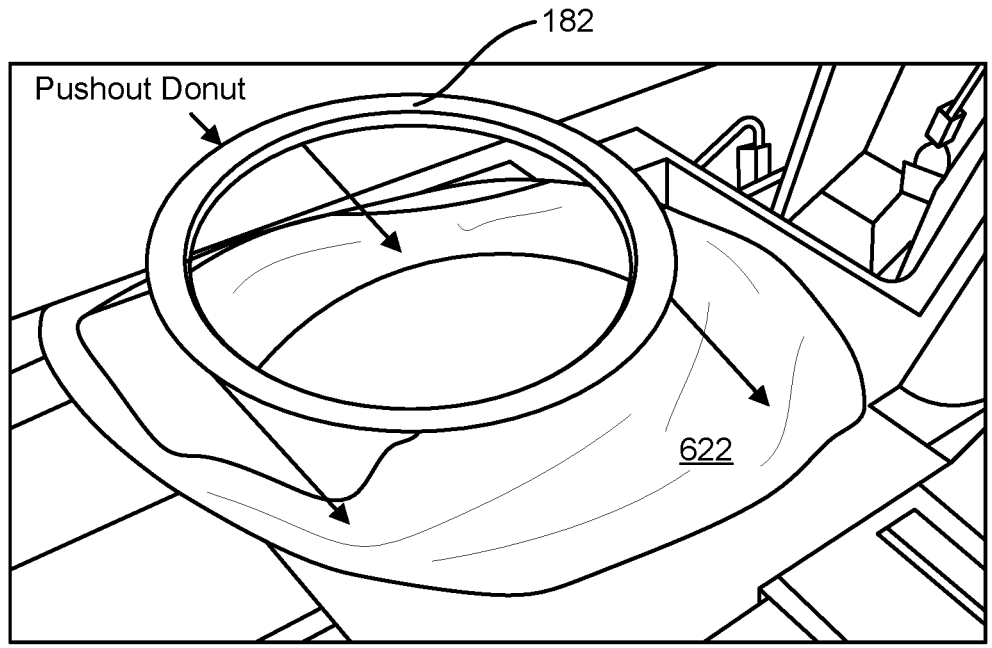
FIG. 6I is a perspective view of an embodiment of a pushout donut.

In step 558, the operator may then determine and select a pushout donut 182 to hold the collection bag in place as illustrated in FIG. 6I. To determine the correct size of the pushout donut 182, the operator may measure the outside diameter of the core and best match the measured diameter to a pushout donut 182. In some embodiments, there are a variety of pushout donuts 182 in various sizes that are likely to be encountered with typical DECD units.

In step 560, the pushout donut 182 is demountably connected to the push plate 180 and the container bag to secure the container bag to the push plate as indicated in FIG. 6I. At step 562, the press preparation sub-process 550 is compete and the flow returns to the core removal process 500.

Figure 6J:
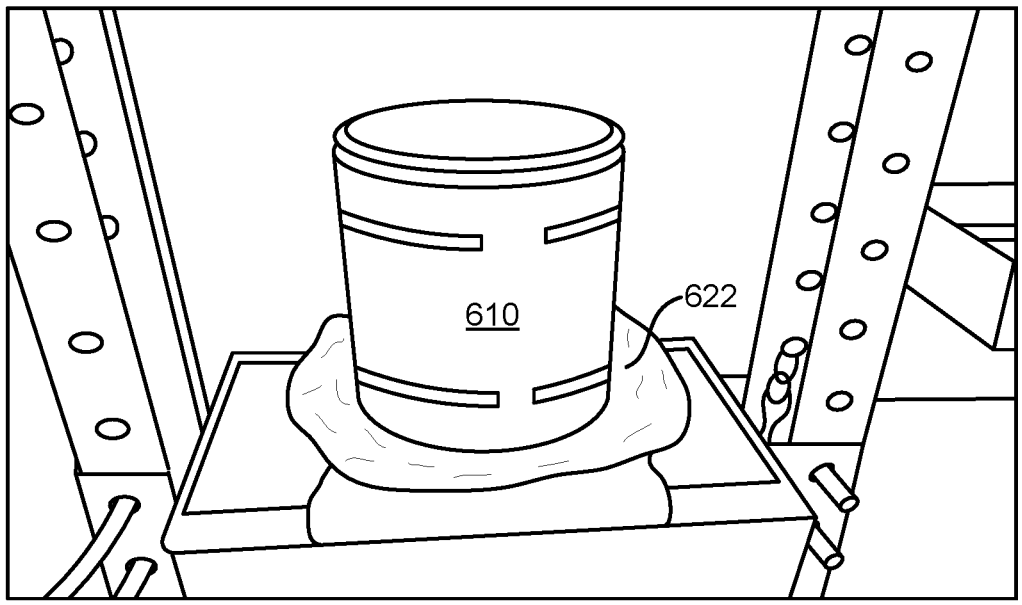
FIG. 6J illustrates the DECD unit position on top of the pushout donut.
Figure 6K:
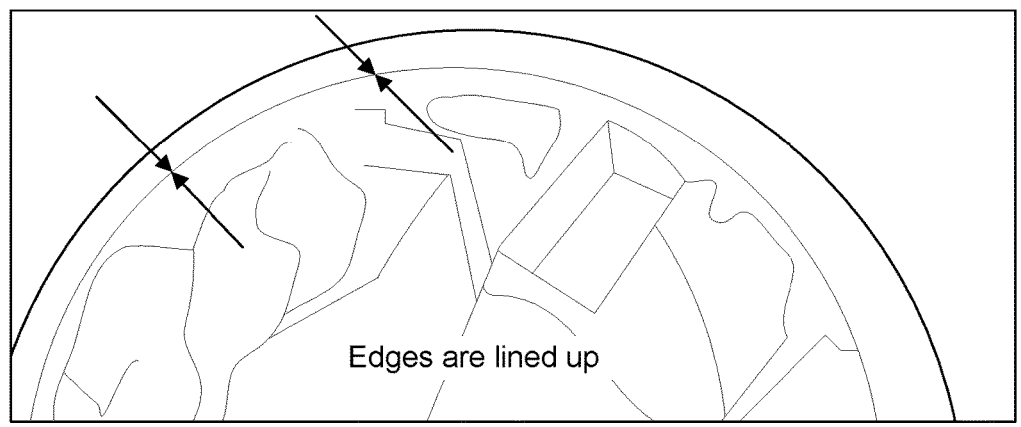
FIG. 6K illustrates the alignment of a DECD housing with a pushout donut.
Figure 6L:
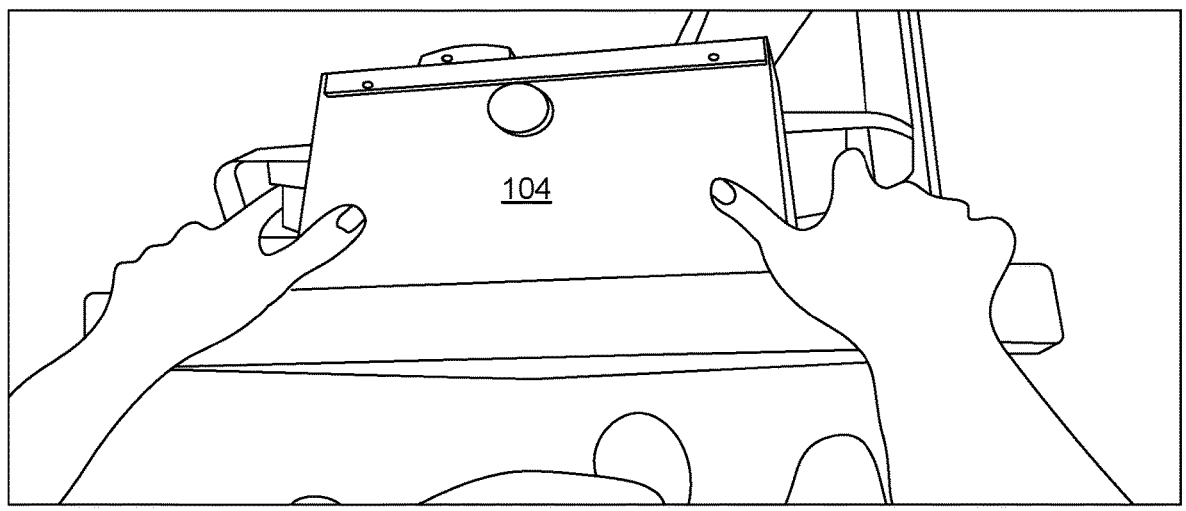
FIG. 6L is a top view illustrating operation of a two-handed sensor system.
Figure 6M:
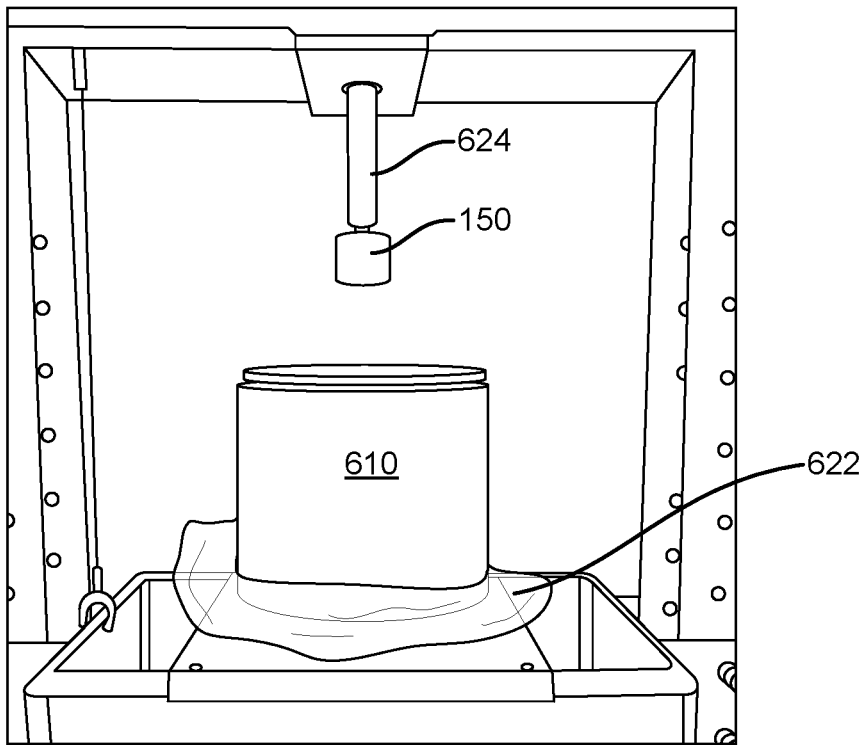
FIG. 6M is a perspective view of the core press station prior to a core removal process.
Figure 6N:
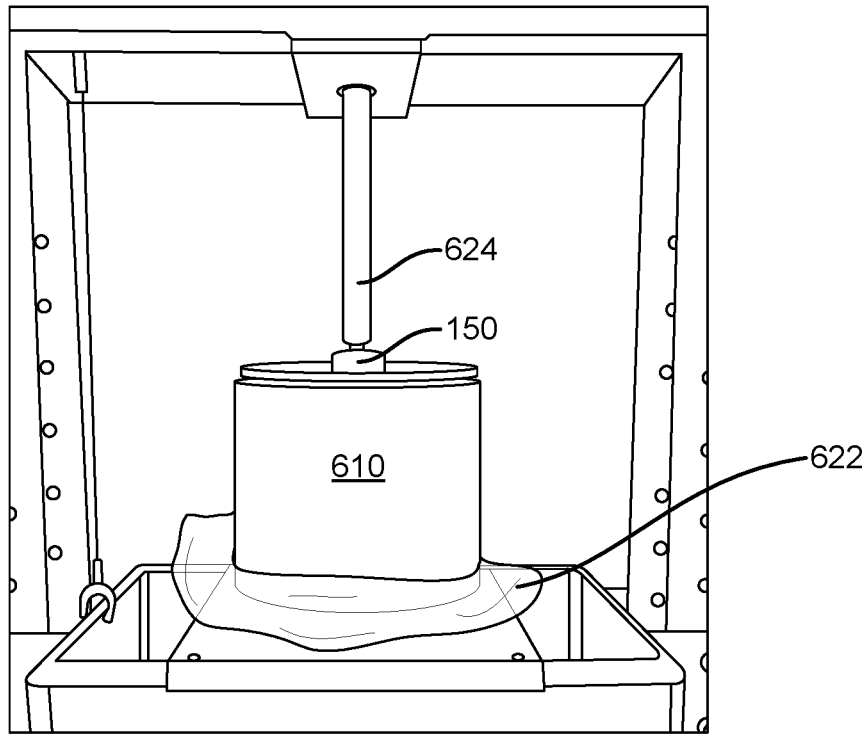
FIG. 6N is a perspective view of the core press station during a core removal process.
Figure 6O:
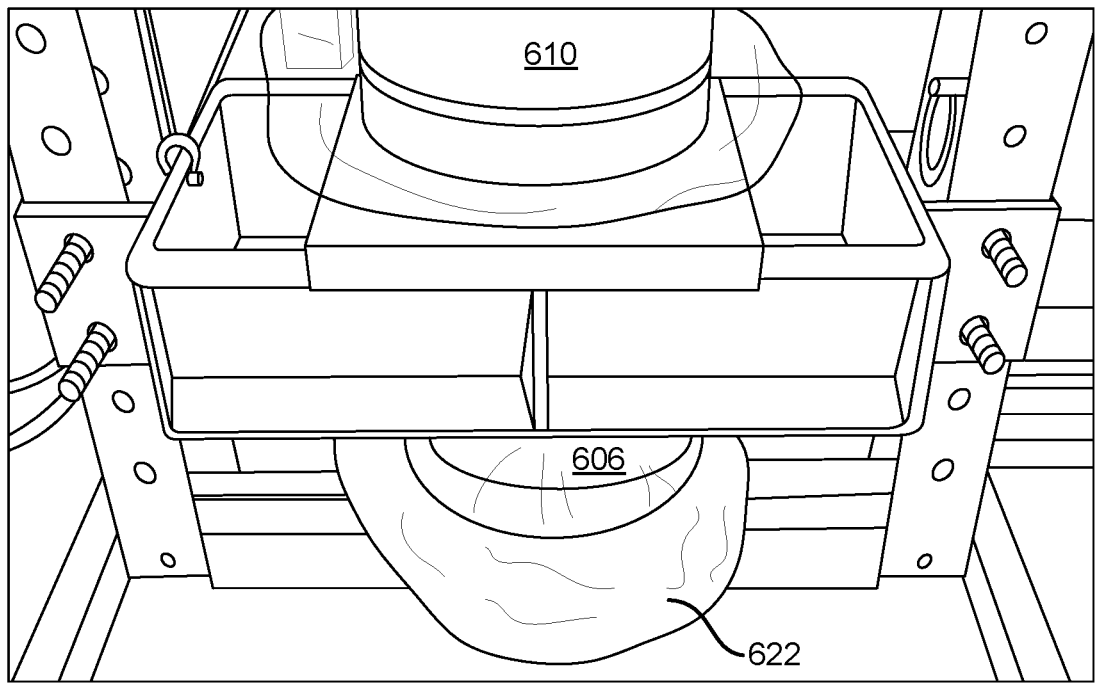
FIG. 6O is a perspective view of the existing core being deposited into a collection container during a core removal process.
Figure 6P:
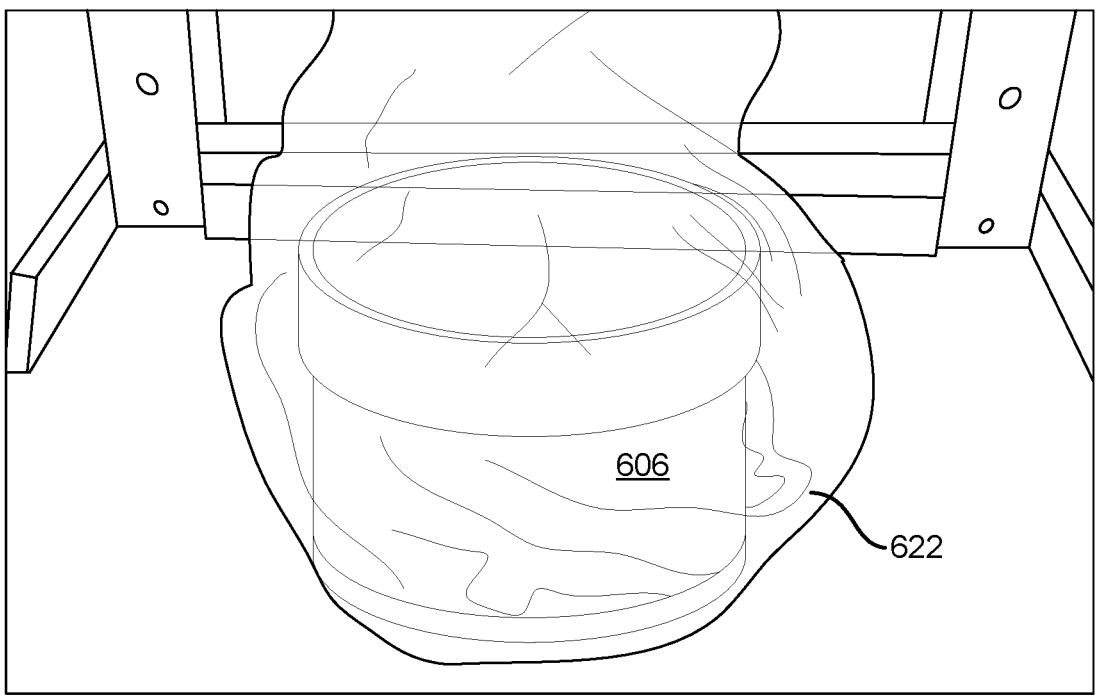
FIG. 6P is a perspective view of the existing core deposited into a collection container after a core removal process.
Figure 6Q:
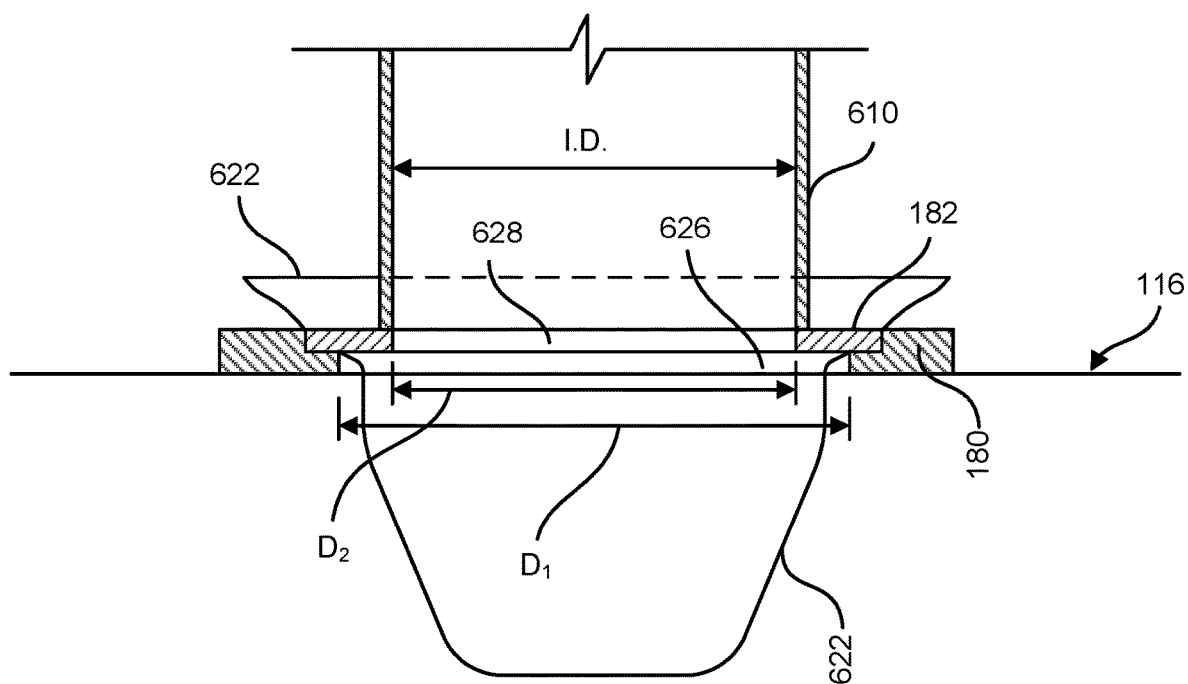
FIG. 6Q is a cross-section view of an embodiment of the DECD housing, push plate, pushout donut, and collection container configured for a core removal process.

Referring to FIG. 6Q, in one embodiment, the collection container 622 is secured between the pushout donut 182 and the push plate 180 so as to create an tight seal between the collection container and pushout donut 182. The push plate 180 comprising a first internal aperture 626 having a first diameter $D_1$ configured to pass the existing core therethrough. The first diameter $D_1$ is greater than the inside diameter (I.D.) of the DECD housing 610. The pushout donut 182 comprising a second internal aperture 628 having a second diameter $D_2$ configured to pass the existing core therethrough; wherein the second diameter $D_2$ is approximately equal to the inside diameter (I.D.) of the DECD housing 610.

In step 510 of the core removal process 500 (FIG. 5A), the DECD unit is positioned on top of the pushout donut 182 and aligned with the aperture of the pushout donut 182 as indicated in FIG. 6J. In other words, the inside diameter of the DECD housing is aligned with the inside diameter of the pushout donut aperture from underneath as indicated in FIG. 6K. In some embodiments, the alignment is checked in three locations at approximately 120° around the diameter of the aperture as indicated in FIG. 6K.

In step 512, the existing core of the DECD unit may be pushed out. In certain embodiments, the control station 104 may comprises a two-handed sensor system for activation control of the core press station. The two-handed sensor system requires an operator to use both of his/her hands, one on each sensor, to activate the hydraulic pump as illustrated in FIG. 6L. The two-handed sensor system reduces the risk of operator injury since both of the operator's hands will be out of the way a moving piston when the core press station is in operation. Once the hydraulic pump is activated, the piston 624 of the master cylinder will begin to move in a downward motion. As explained previously, the piston 624 is coupled to the decore shaft 150 and decore engagement plate 154. Thus, as the piston moves in a downward direction so does the decore shaft 150 and decore engagement plate 154. When the decore engagement plate 154 reaches the top of the existing core 606 of the DECD unit 600, the decore engagement plate 154 begins to push the existing core 606 out of the DECD housing 610 as shown in FIGS. 6M-6N.

As the decore engagement plate 154 continues to push the existing core 606, the existing core 606 then drops into the collection container 622, such a bag, which has been positioned and configured to receive the existing core 606 when it drops into the collection container 622, as indicated in FIG. 6O.

In step 514, once the existing core 606 has been pushed entirely out of the housing and into the collection container 622, the collection container 622 may be sealed as indicated in FIG. 6P. The collection container 622 may be sealed and sent offsite for recycling. The core removal process 500 ends at step 516.

Core Insertion Process

Figure 7A:
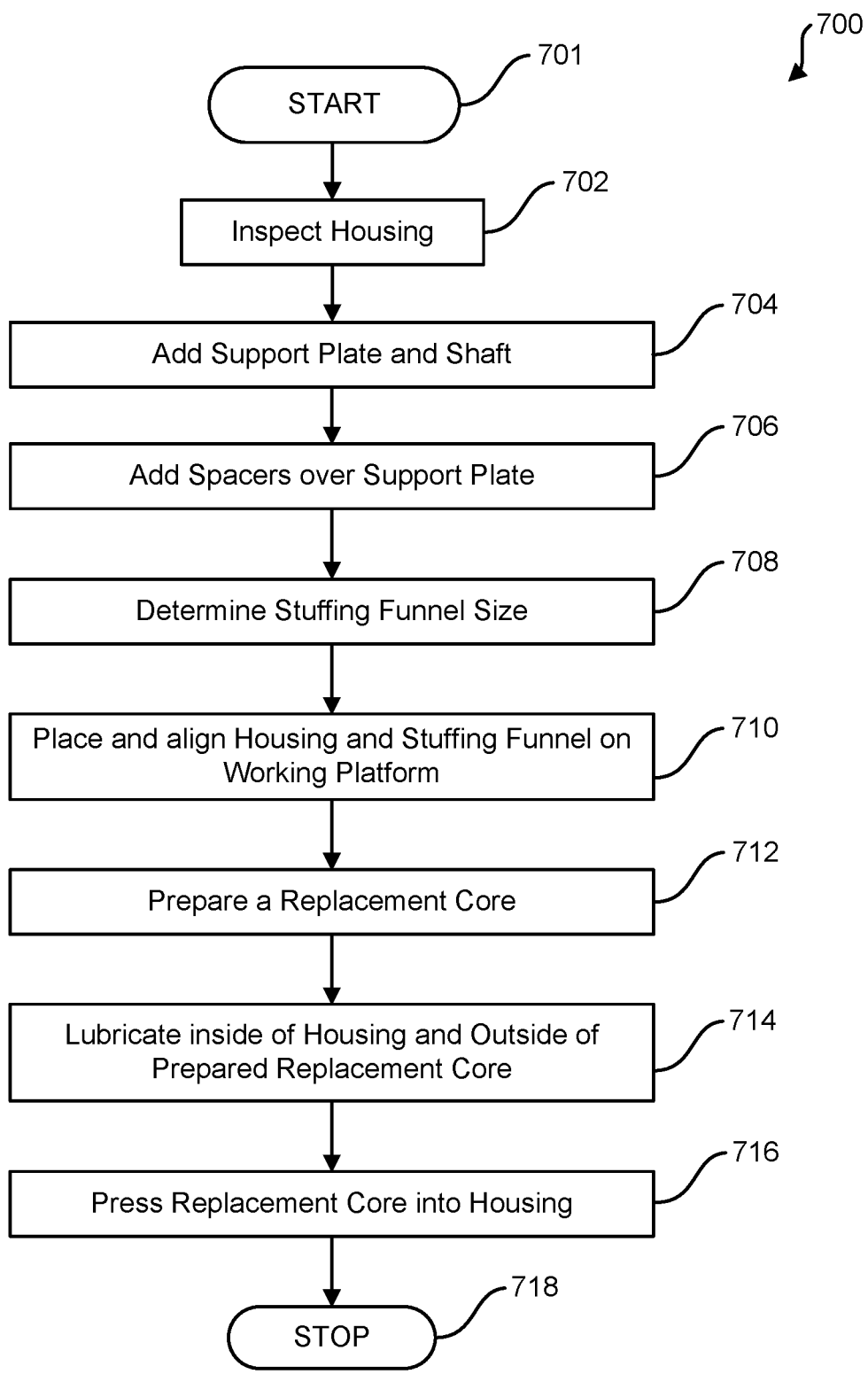
FIG. 7A is a flow chart illustrating an embodiment of core insertion process.

Referring now to FIGS. 7A-8K, the manner of using one embodiment of the system 100 will now be illustrated as a core insertion process 700 for inserting a replacement core 804 into a DECD housing 610. The steps of the core insertion process 700 are illustrated in FIG. 7A which is a process flow diagram. Various details relating to the individual steps in the core insertion process 700 are presented in FIGS. 7A-8K.

The core insertion process 700 starts at step 701 and flows to step 702 where an operator may inspect an interior surface of the DECD housing 610 to ensure that all the matting, gaskets or any other foreign matter is removed before the installation of a replacement core 804.

In step 704, any tooling such as the pushout donut 182 is removed from the working platform 116 and a support plate 802 is placed on the working platform 116. Additionally, in certain embodiments, the removal or decore shaft 150 may be replaced with the insertion or recore shaft 200. In step 706, the spacers 220 are positioned on top of the support plate 802 having a thickness equal the overhang dimension D that was previously recorded above. See FIG. 8A.

In step 708, the size and model of the stuffing funnel 210 may be determined from the outside diameter (O.D.) of the replacement core 804 and the inside diameter (I.D.) of the DECD housing 610. For examples, a mapping between a model of the stuffing funnel 210 and the corresponding O.D.s and I.D.s may be selected in accordance with Table 1 below. Other sizes and models (not shown in Table 1) of the stuffing funnel 210 may be based on the dimensions of the replacement core 804, the DECD housing 610, and/or the application of the DECD unit 600.

TABLE 1

| DECD Housing I.D. (inches) | Replacement Core O.D. (inches) | Stuffing Funnel Model |
|---|---|---|
| 12.295-12.335 (no flange housing) | 12 | FUN12-01 |
| 12.295-12.335 | 12 | FUN12-02 |
| 12.452-12.492 | 12 | FUN12-00 |
| 10.952-10.992 | 10.5 | FUN10.5-00 |
| 10.702-10.742 | 10.25 or 10.5 | FUN10.25-00 |
| 9.452-9.492 | 9 | FUN09-00 |

Figure 8A:
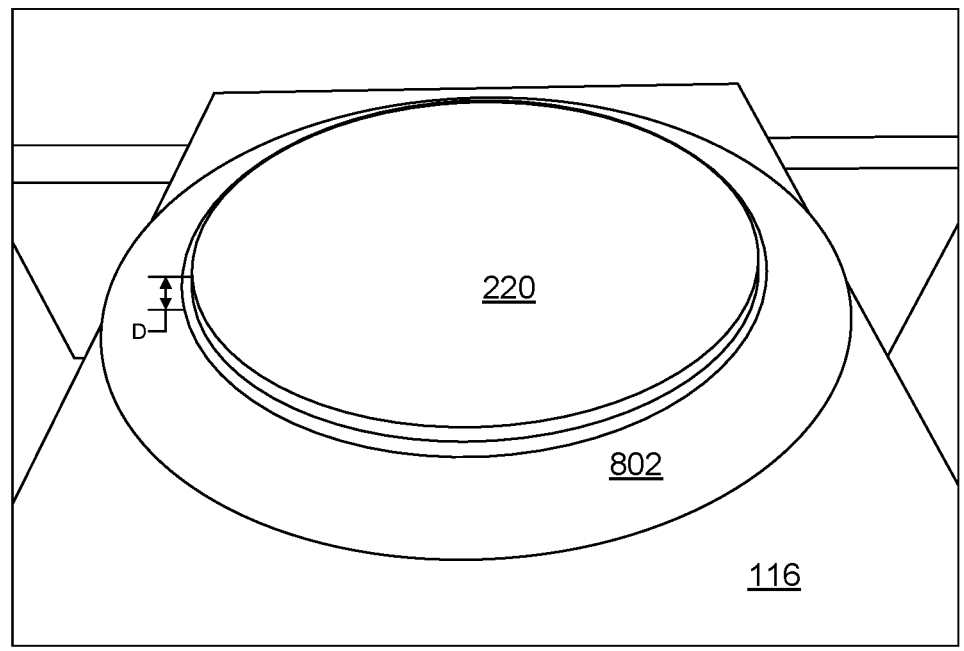
FIG. 8A is a perspective view of an embodiment of spacers and a support plate.
Figure 8B:
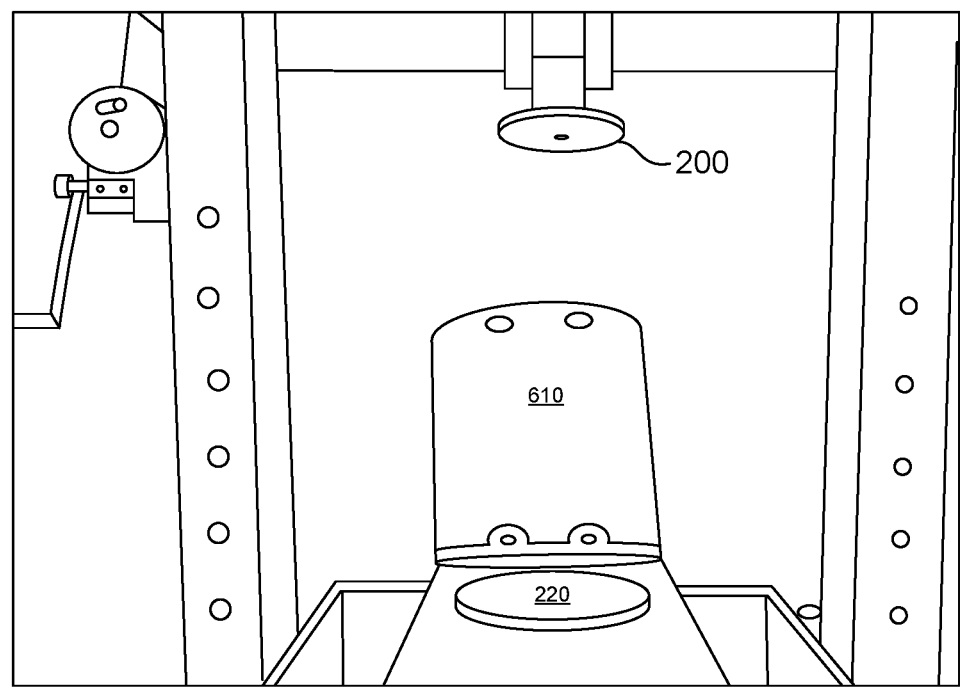
FIG. 8B is a perspective view of an embodiment of the recore shaft, DECD housing, and spacers.
Figure 8C:
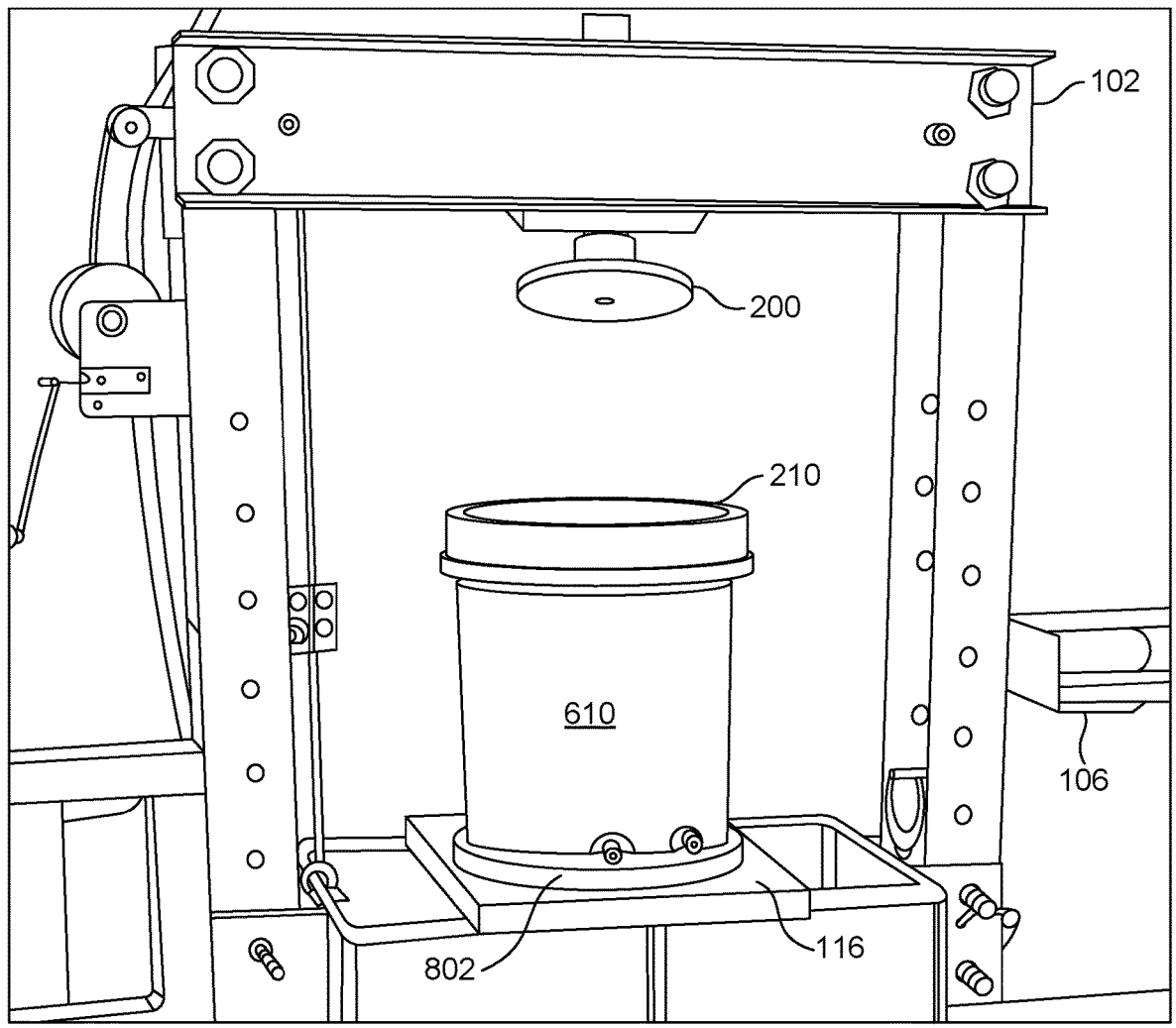
FIG. 8C is a perspective view of an embodiment the DECD housing and stuffing funnel position upon the working platform of the core press station.

After the stuffing funnel 210 model has been selected, in step 710, the stuffing funnel 210 may be coupled to the upper end of the DECD housing 610, now empty, and the DECD housing 610 may be positioned on top of the spacers 220 and the support plate 802 as illustrated in FIGS. 8B and 8C. In certain embodiments, alignment of the stuffing funnel 210 to the interior of the DECD housing may be important to proper insertion of a replacement core 804.

Figure 7B:
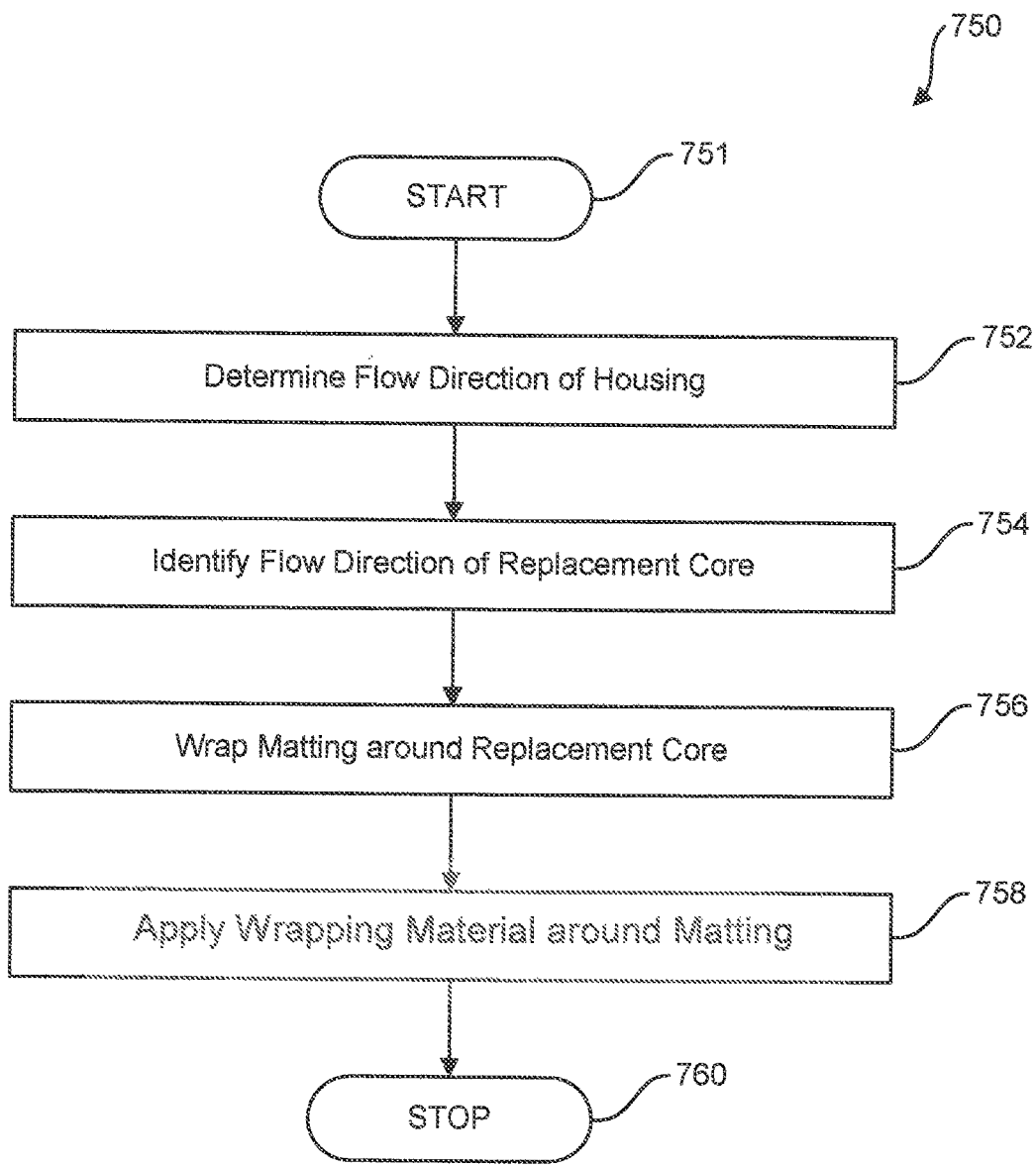
FIG. 7B is a flow chart illustrating an embodiment of a core preparation sub-process.

The replacement core 804 may be prepared for insertion into the stuffing funnel 210 in step 712. Turning now to FIG. 7B, there is illustrated a core preparation sub-process 750 for preparing a replacement core 804. The core preparation sub-process 750 begins at step 751 where the flow goes to step 752. In step 752, an identification of a housing flow direction of the housing is made as it sits in the press frame 110. In an embodiment, the DECD housing is aligned with the working platform based on the housing flow direction so that the housing flow direction is pointed towards the working platform. In step 754, an identification of a core flow direction of the replacement core 804 is determined. For instance, certain cores are marked with the letters "OT" on the outlet of the core. This information will determine the insertion end of the core because the housing flow direction of the DECD housing 610 should be aligned and in the same direction with the core flow direction of the replacement core 804. In some embodiments, a properly inserted core will have the flow arrow of the DECD housing pointed to the outlet side of the core and the outlet side of the core will be labeled with the letters "OT".

Figure 8D:
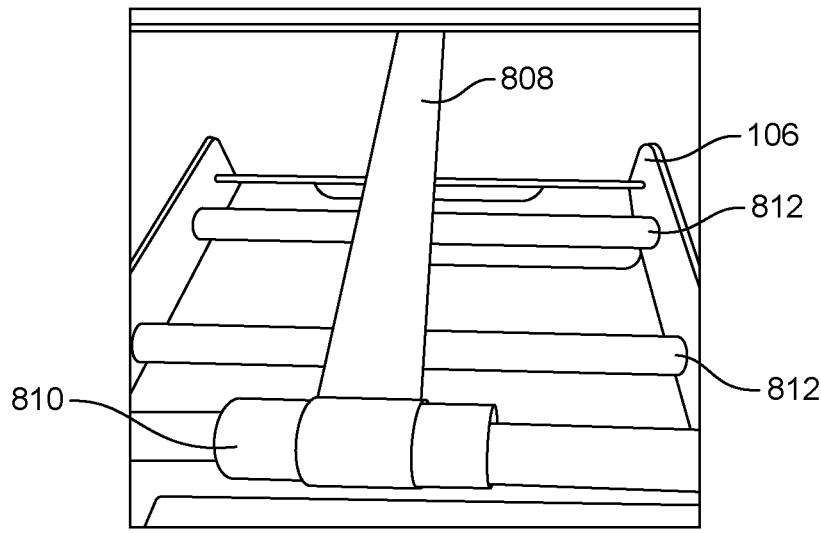
FIG. 8D is a perspective view of an embodiment of an adjustable wrapping station.
Figure 8E:
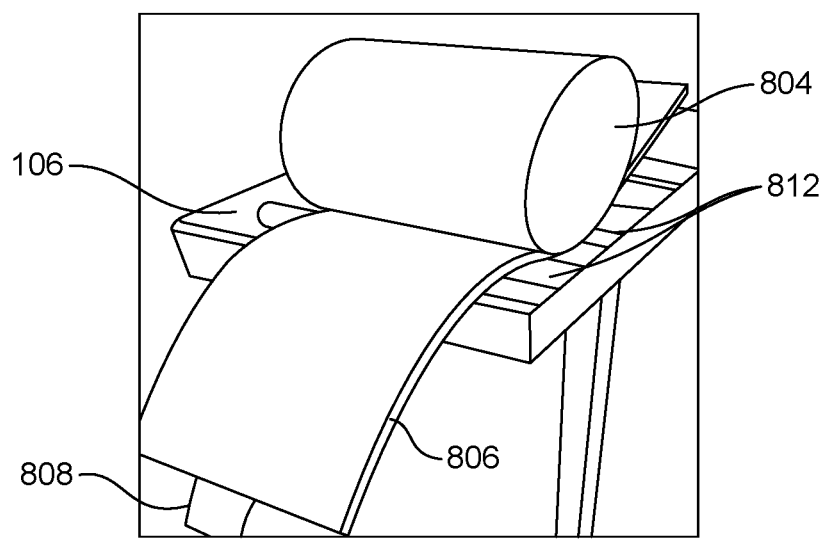
FIG. 8E is a perspective view of an embodiment of an adjustable wrapping station supporting a replacement core and matting.
Figure 8F:
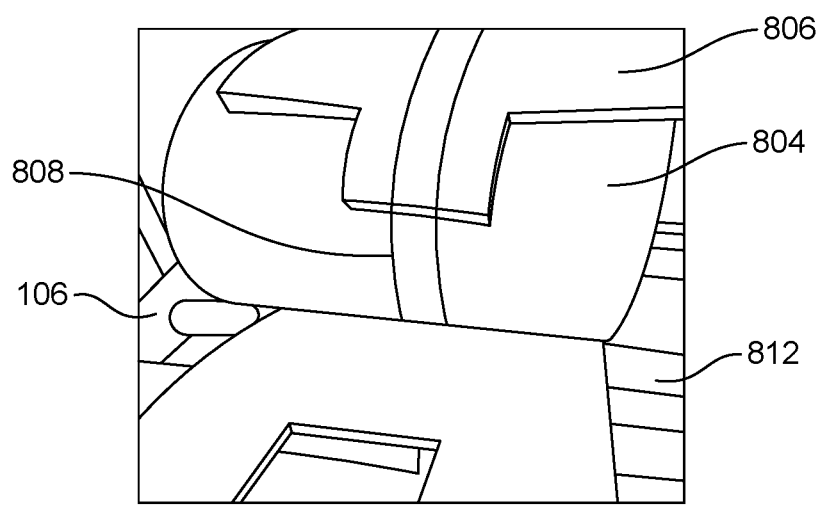
FIG. 8F is a perspective view of an embodiment of a replacement core prepared with a matting and a wrapping material.
Figure 8G:
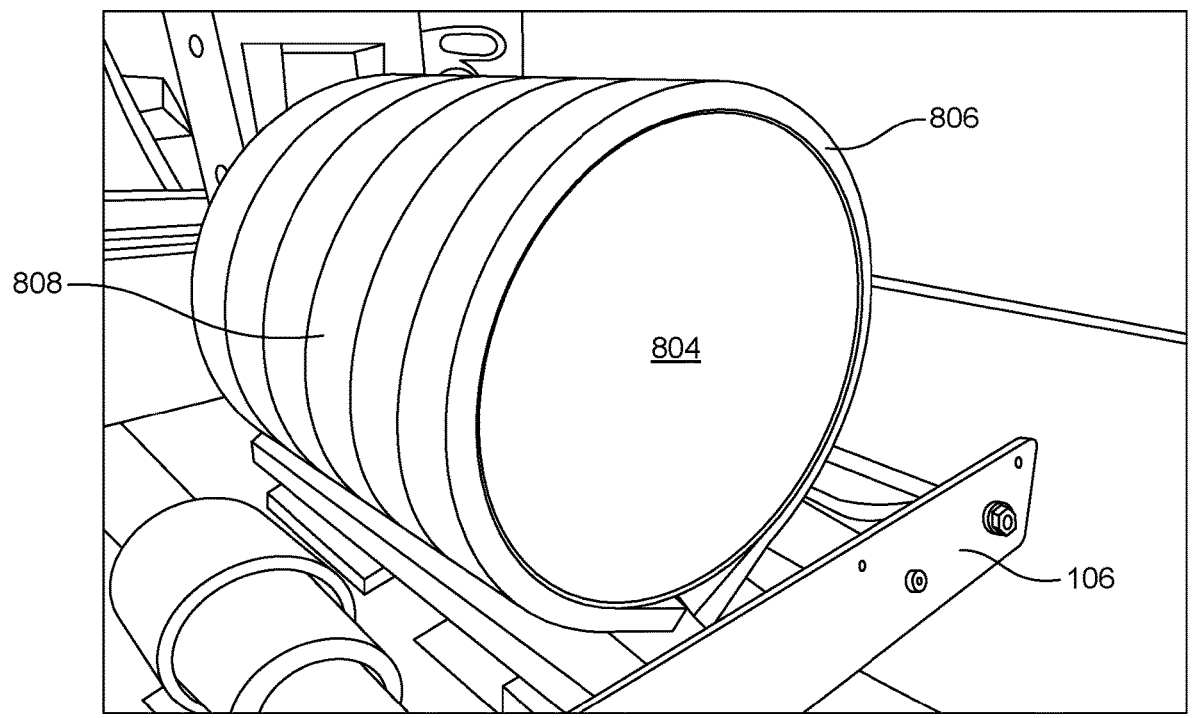
FIG. 8G is a perspective view of an embodiment of a replacement core prepared with a matting and a wrapping material.

In step 756, a matting 806 is wrapped around the replacement core 804. In certain embodiments, the matting 806 is made from a fibrous material known in the art. Approximately three feet of a wrapping material 808, such as wrapping tape, may be pulled from a tape roller 810 of the adjustable wrapping station 106 as illustrated in FIG. 8D. The wrapping material 808 may comprise various widths depending on the application. The matting 806 may then be placed on a set of rollers 812 of the adjustable wrapping station 106 and the replacement core 804 placed on top of the matting 806 as illustrated in FIG. 8E. The wrapping material 808 may then be tightly wrapped around the matting 806 as illustrated in FIGS. 8F and 8G. In an embodiments, the wrapping material 808 may be standard wrapping tape.

Figure 8H:
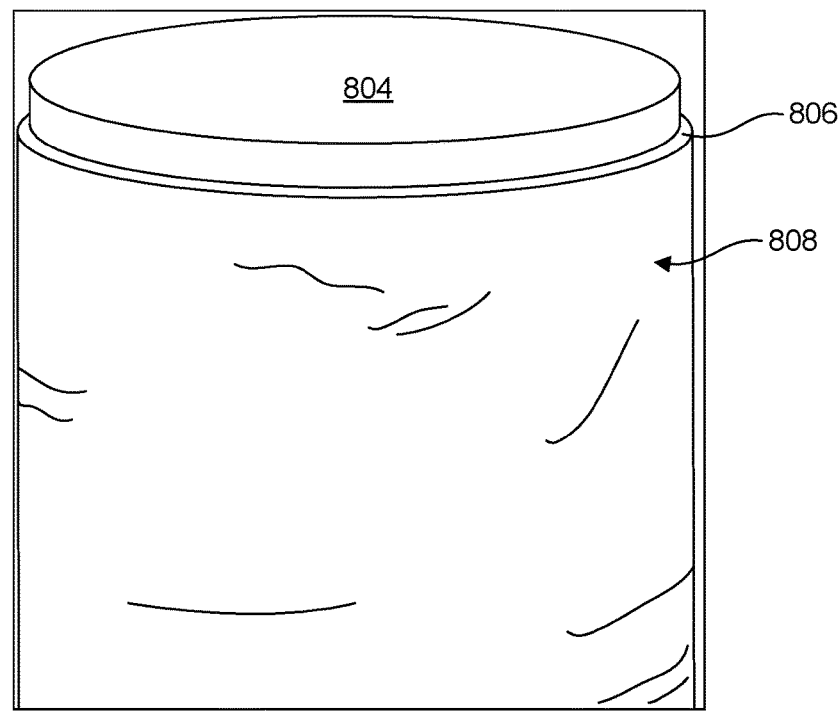
FIG. 8H is a perspective view of an embodiment of a replacement core prepared with a matting and a wrapping material.

In certain embodiments, the matting 806 may be aligned with the edge that will first pass through the stuffing funnel 210. In step 758, the wrapping material 808 is then used to tightly wrap around the entire exterior surface of the matting 806 so that a lubricant (not shown) can be applied to the outside of the wrapping material 808 before insertion into the stuffing funnel 210 as illustrated in FIG. 8H. Step 760 ends the core preparation sub-process 750 and the core insertion process 700 resumes with step 714 of FIG. 7A.

Figure 8I:
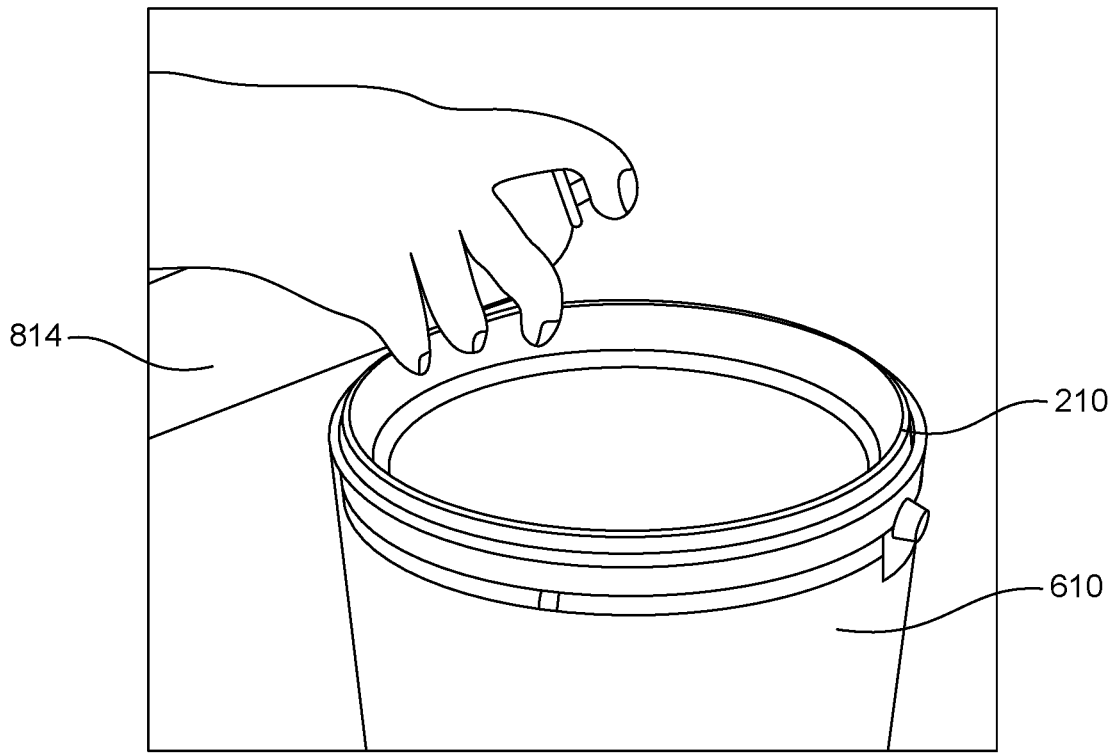
FIG. 8I is an illustration of the preparation of the stuffing funnel with a lubricant.
Figure 8J:
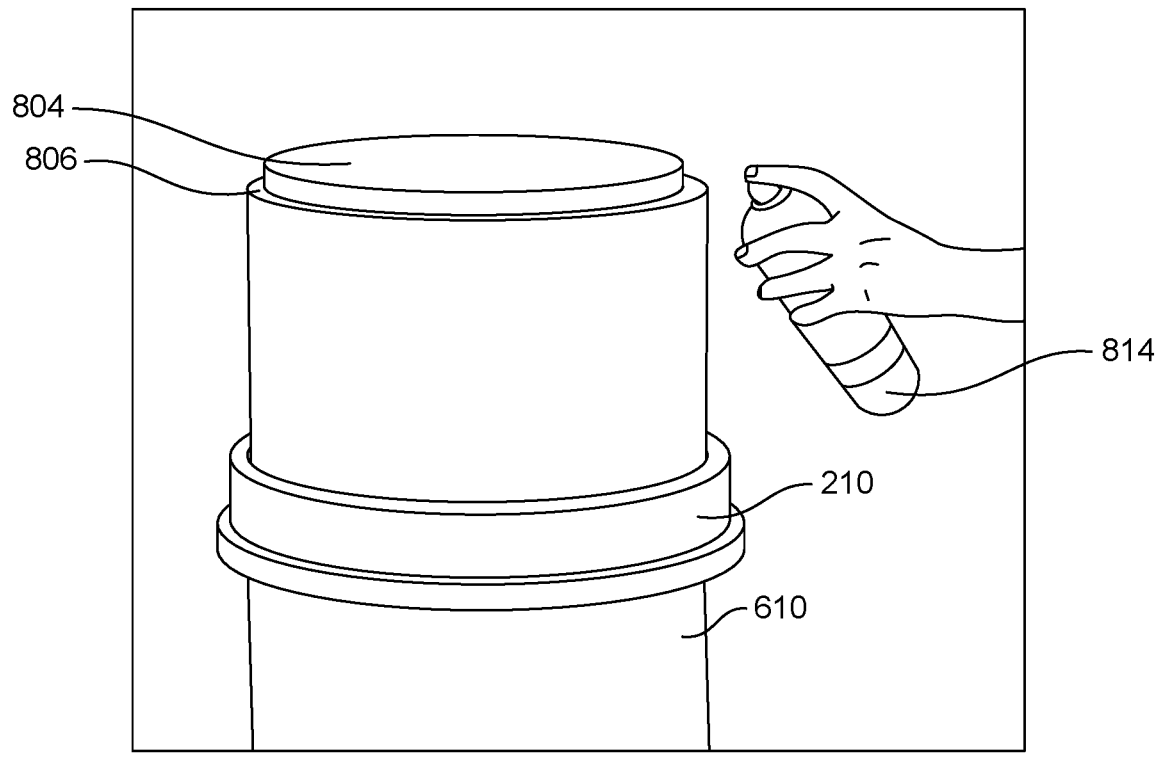
FIG. 8J is an illustration of the preparation of the wrapping material with a lubricant.

In step 714, the inside of the DECD housing 610 is inspected to ensure there is no debris inside the DECD housing 610. If the inside of the DECD housing 610 is clean, a lubricant 814 may be applied to an interior surface the DECD housing 610 as illustrated in FIG. 8I. In certain embodiments, the lubricant 814 may comprise canola oil, palm oil and coconut oil and lecithin. The correct end of the matting 806 is then placed into the stuffing funnel 210 and the outside of the wrapping material 808 is also sprayed with the lubricant as illustrated in FIG. 8. The prepared core should be carefully placed into the stuffing funnel such that the stuffing funnel does not move. If the stuffing funnel moves, a misalignment may result in damage to the equipment, the DECD housing 610 or replacement core 804.

Figure 8K:
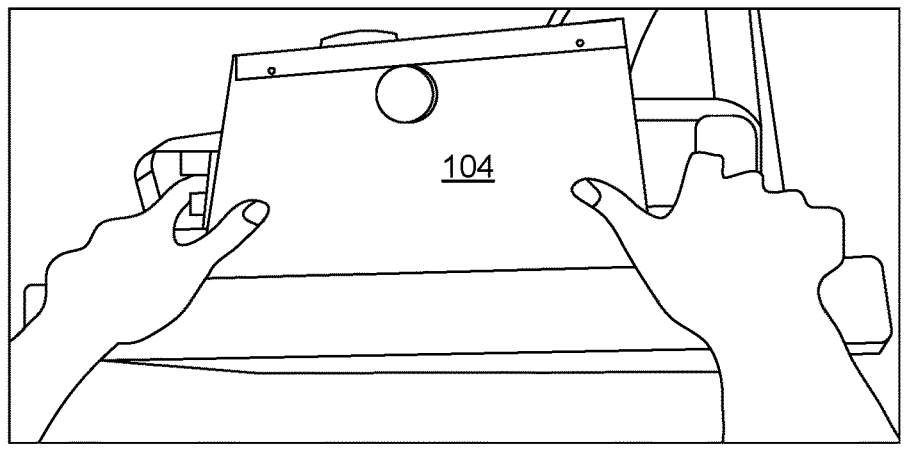
FIG. 8K a top view illustrating operation of a two-handed sensor system during a core insertion process.
Figure 8L:
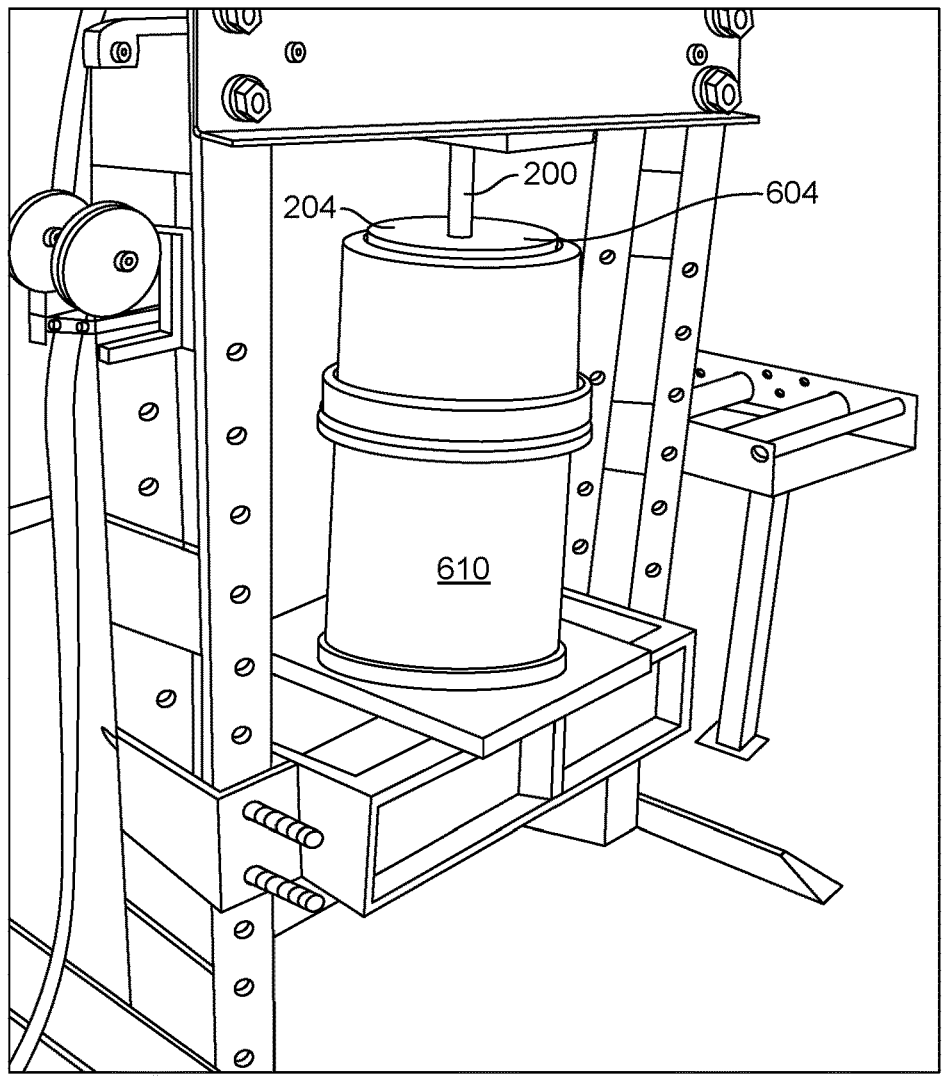
FIG. 8L is a perspective view of an embodiment of core insertion process.

In step 716, the replacement core replacement may be pressed into the DECD housing 610. As described above, in certain embodiments, the activation control for the core press station 102 may comprise a two-handed sensor system as illustrated in FIG. 8K. In other words, in certain embodiments, activation requires two hands, one hand on each sensor to activate the hydraulic pump. Once the hydraulic pump is activated, the piston 624 of the master cylinder 122 will begin to move in a downward motion. As explained previously, the piston 624 is coupled to the recore shaft 200 and recore engagement plate 204. Thus, as the piston 624 moves in a downward direction so does the recore shaft 200 and recore engagement plate 204. When the recore engagement plate 204 reaches the top of the replacement core 804, the recore engagement plate 204 begins to press the replacement core 804 into the DECD housing 610 as illustrated in FIG. 8L. In another embodiment, the replacement core 804 is positioned between the working platform 116 and the DECD housing 610, whereby movement of the piston 624 presses the recore engagement plate 204 upon the replacement core 804 and therefore presses the DECD housing onto the replacement core 804.

As the replacement core 804 moves through the stuffing funnel 210, the operator may observe the core insertion process 700 to ensure that the replacement core 804 is pushing level. If the replacement core 804 begins to go out of level, the operator may stop the movement of the piston 624 and adjust the alignment of the replacement core 804 until it is level and axially aligned with the DECD housing 610. The operator should also ensure that the matting 806 does not slide relative to the replacement core 804 during the core insertion process 700. The operator may continue to lower the piston 624 until the replacement core 804 abuts one of the spacers 220. The core insertion process 700 ends at step 718.

From the foregoing, those skilled in the art will recognize that the disclosed subject matter provide significant advantages to the field of removal and replacement of DECD cores; in particular providing a system, components, methods of installation thereof. It is to be understood that while certain aspects of the disclosed subject matter have been shown and described, the disclosed subject matter is not limited thereto and encompasses various other embodiments and aspects.

The abstract of the disclosure is provided for the sole reason of complying with the rules requiring an abstract, which will allow a searcher to quickly ascertain the subject matter of the technical disclosure of any patent issued from this disclosure. It submitted with the understanding that it will not be used to interpret or limit the scope or meaning of the claims.

Any advantages and benefits described may not apply to all embodiments of the invention. When the word "means" is recited in a claim element, Applicant intends for the claim element to fall under 35 USC 112(f). Often a label of one or more words precedes the word "means." The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 U.S.C. 112(f).

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above described components and features may be individually or sequentially combined with other components or features and still be within the scope of the present invention. Undescribed embodiments which have interchanged components are still within the scope of the present invention. It is intended that the scope of the invention be limited not by this detailed description, but rather by the claims.

Having described the disclosed subject matter, what is claimed as new and desired to be secured by Letters Patent is:

1. A system for removing an existing core from a DECD housing comprising:
   a core press station having a piston and a working platform;
   a control station for controlling movement the piston;
   a decore shaft connected to the piston;
   a push plate positioned upon the working platform, the push plate having a first internal aperture configured to pass the existing core therethrough;
   a pushout donut demountably connected to the push plate, the pushout donut having a second internal aperture configured to pass the existing core therethrough; and
   a collection container connected between the push plate and the pushout donut, the collection container configured to receive the existing core,
   whereby movement of the piston is configured to push the existing core out of the DECD housing.

2. The system of claim 1, wherein the decore shaft comprises:
   a decore shaft portion having a first female aperture configured to connect to the piston; and
   a decore engagement plate disposed opposite the first female aperture.

3. The system of claim 1, wherein the first internal aperture comprises a first diameter, the first diameter is greater than an inside diameter of the DECD housing.

4. The system of claim 1, wherein the second internal aperture comprises a second diameter, the second diameter is approximately equal to an inside diameter of the DECD housing.

5. The system of claim 1, wherein the control station comprises a two-handed sensor system for activation control of the core press station; wherein the two-handed sensor system is configured to require two hands of an operator to activate the core press station.

* * * * *